US008537661B2

(12) United States Patent
Yoshimura

(10) Patent No.: US 8,537,661 B2
(45) Date of Patent: Sep. 17, 2013

(54) NETWORK CONNECTION APPARATUS AND A METHOD THEREOF

(75) Inventor: Mikihiro Yoshimura, Tokyo (JP)

(73) Assignee: NEC Corporation, Tokyo (JP)

( * ) Notice: Subject to any disclaimer, the term of this patent is extended or adjusted under 35 U.S.C. 154(b) by 686 days.

(21) Appl. No.: 12/536,048

(22) Filed: Aug. 5, 2009

(65) Prior Publication Data

US 2010/0034081 A1    Feb. 11, 2010

(30) Foreign Application Priority Data

Aug. 7, 2008   (JP) ................................. 2008-204244

(51) Int. Cl.
    *G06F 11/00*    (2006.01)
(52) U.S. Cl.
    USPC ............................ 370/219; 370/242; 370/352
(58) Field of Classification Search
    USPC ................. 370/216–220, 242–254, 352–354, 370/389, 392, 410, 428
    See application file for complete search history.

(56) References Cited

U.S. PATENT DOCUMENTS

| 7,177,943 | B1 * | 2/2007 | Temoshenko et al. | ........ 709/237 |
| 7,535,823 | B1 * | 5/2009 | Malhotra et al. | ............... 370/216 |
| 2003/0145108 | A1 * | 7/2003 | Joseph et al. | ................. 709/239 |

FOREIGN PATENT DOCUMENTS

| JP | 2002261798 | A  | 9/2002 |
| JP | 2002261798 | A2 | 9/2002 |
| JP | 2002290428 | A2 | 10/2002 |
| JP | 2006229985 | A  | 8/2006 |
| JP | 2006333077 | A2 | 12/2006 |
| JP | 2007184681 | A  | 7/2007 |
| JP | 2007184681 | A2 | 7/2007 |
| WO | 0160000 | A  | 8/2001 |
| WO | 2004084572 | A  | 9/2004 |

OTHER PUBLICATIONS

European Search Report for EP 09 16 6808 completed Oct. 6, 2009.

* cited by examiner

*Primary Examiner* — Donald Mills
*Assistant Examiner* — Mon Cheri Davenport

(57) ABSTRACT

A network connection apparatus includes, a pair of line interface circuits which accommodates each transmission line provided to interface with the circuit-switched network, composes an active line and a standby line of the redundant configuration, and mutually converts data used in the circuit-switched network and a packet used in the packet-switched network; and a packet processing unit which interfaces with the packet-switched network and performs a sending and receiving process of the packet between the line interface circuit and the packet-switched network. The packet processing unit transmits the packet received only from the line interface circuit of the active line to the packet-switched network, and transmits the packet received from the packet-switched network to both of the line interface circuits of the active line and the standby line. The line interface circuit acquires the packet transmitted from the packet processing unit when a destination MAC address included in the packet coincides with a first MAC address which is given to own line interface circuit or a second MAC address which is given to the other line interface circuit of pair for the redundant configuration.

30 Claims, 20 Drawing Sheets

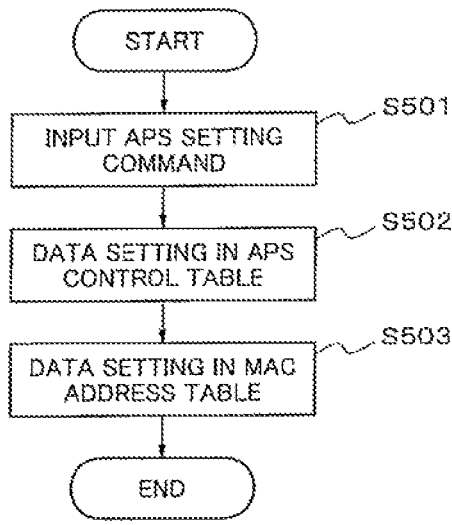

Fig.8

IN CASE OF NORMAL

| PORT NUMBER | EFFECTIVE/ INVALID | MATCHING PORT NUMBER | STATE |
|---|---|---|---|
| 0 | O | 1 | ACTIVE |
| 1 | O | 0 | STANDBY |

IN CASE OF MAINTENANCE CHANGE-OVER

| PORT NUMBER | EFFECTIVE/ INVALID | MATCHING PORT NUMBER | STATE |
|---|---|---|---|
| 0 | O | 1 | STANDBY |
| 1 | O | 0 | ACTIVE |

IN CASE OF CIRCUIT FAILURE CHANGE-OVER

| PORT NUMBER | EFFECTIVE/ INVALID | MATCHING PORT NUMBER | STATE |
|---|---|---|---|
| 0 | × | 1 | FAILURE/ BLOCKED |
| 1 | × | 0 | ACTIVE |

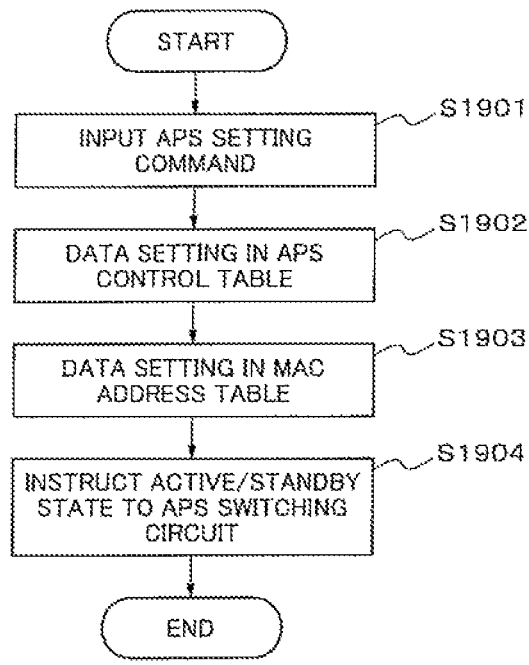

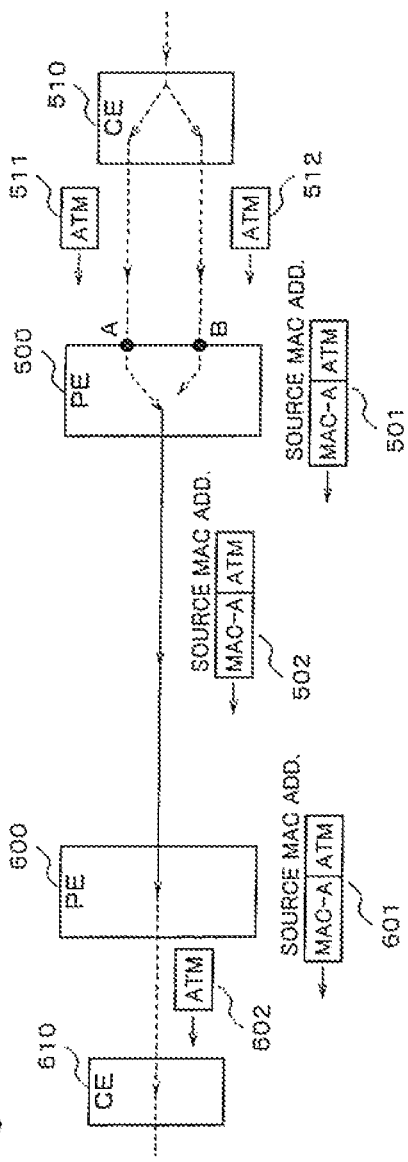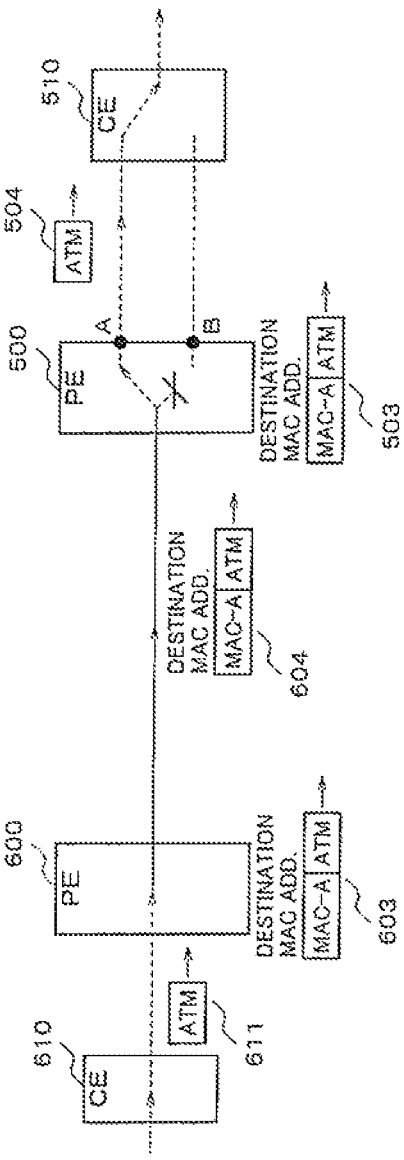

NETWORK CONNECTION APPARATUS AND A METHOD THEREOF

This application is based upon and claims the benefit of priority from Japanese patent application No. 2008-204244, filed on Aug. 7, 2008 the disclosure of which is incorporated herein in its entirety by reference.

TECHNICAL FIELD

The present invention relates to a network connection apparatus and a method thereof, and in particular, relates to a network connection apparatus which is provided with an APS (Automatic Protection Switching) function and interconnects a circuit-switched network, which includes an ATM (Asynchronous Transfer Mode) network and a TDM (Time Division Multiplex) network, and a packet-switched network.

BACKGROUND ART

In recent years, information and telecommunications networks based on IP (Internet Protocol) technology are rapidly spread and widely used. In particular, the information and telecommunications network using Ethernet (registered trademark) is spreading rapidly as the wide area Ethernet (registered trademark) service. And, the network construction technology of the information and telecommunications network is shifting to NGN (Next Generation Network) by leading with the packet-switched network.

However, circuit-switched apparatuses based on the connection oriented technology, such as an ATM (Asynchronous Transfer Mode) technology or a TDM (Time Division Multiplex) technology, are still used in many Common Carrier networks and Private Business networks. And, it is also strongly required to provide services using these legacy facilities of the circuit-switched network in the packet-switched network from an economical point of view.

Patent document 1 (Japanese Patent Application Laid-Open No. 2007-184681) discloses an ATM converter which is capable of providing broadband and cheap communication services by connecting ATM apparatuses transmitted in multi spots to the information and telecommunications network using Ethernet (registered trademark). This ATM converter includes an ATM interface, an Ethernet interface and a media converting means. This ATM converter converts ATM cells supplied from the ATM apparatus into Ethernet frames and transmits the converted Ethernet frames to the wide area Ethernet (registered trademark) network. This ATM converter also converts Ethernet frames received from the wide area Ethernet (registered trademark) network into ATM cells and supplies them to the ATM apparatus.

On the other hand, in the field of the mobile communication, data communication is increasing rapidly in a so-called mobile backhaul area. The mobile backhaul area is a mobile access network which connects between BTS (Base Transceiver Station) and BSC/RNC (Base Station Controller/Radio Network Controller) in 2G (Second Generation Mobile System) and 3G (Third Generation Mobile System). This rapid increase phenomenon of data communication in the backhaul area is mainly caused by sudden augmentation of demand for a music distribution service, a video download service and other new services relating to multimedia.

In the mobile backhaul area, facilities using the ATM technology and the TDM technology are intermingled with each other. Therefore, network management works are becoming more complicated and the extension of facilities itself in the mobile backhaul area is also becoming in a difficult situation.

From such reasons, there is a movement of constructing a mobile communication network using ALL-IP technology, i.e., ALL-IP mobile communication network, in which communication protocols of the backhaul network and the backbone network are integrated into the IP protocol. This movement aims at efficiency of network facilities and practical operation. And, a solution for being migrated to the ALL-IP mobile communication network is desired while keeping existing facilities in the mobile backhaul area as they are.

As a means for being migrated to the ALL-IP technology network while keeping existing facilities as they are, PWE (Pseudo Wire Emulation) technology is highly expected which transmits data generated by facilities of the TDM/ATM technology on the IP based network.

PWE is a technology proposed by IETF (The Internet Engineering Task Force). And, it is defined as "PWE3 (Pseudo Wire Emulation edge to edge) is a mechanism which emulates the basic attribute in the service like ATM, frame relay or Ethernet over packet-switched network (PSN)".

Patent document 2 (Japanese Patent Application Laid-Open No. 2006-229985) discloses technology which provides an automatic PW (Pseudo Wire) peer detection mechanism in an Ethernet based network. This technology can acquire MAC (Media Access Control) address of a partner PW peer in a far end by exchanging information with the partner PW peer.

However, there is a problem to be settled in order to construct a system which transmits data generated by the existing facilities of TDM/ATM technology on the packet-switched network while keeping existing facilities as they are. The problem is caused by difference in a concept of network reliability between the packet-switched network and the circuit-switched network. That is, the packet-switched network is not sufficient in an aspect of communication quality control while the circuit-switched network such as the TDM/ATM network is provided with the high reliability of communication quality control.

For example, the APS (Automatic Protection Switching) function is an indispensable function in the circuit-switched network. The APS function is a function to improve stability and easiness in a maintenance aspect and a service operation aspect for a communication network by providing an active line and a standby line as a redundant configuration, and the active line and the standby line are changed over appropriately. Patent document 3 (Japanese Patent Application Laid-Open No. 2002-261798) discloses technology about an ATM line switching apparatus by the APS function.

When constructing the system which transmits data of the TDM/ATM apparatus on the packet-switched network, it is desirable to introduce the APS function for improving stability and easiness in the maintenance aspect and the service operation aspect for the system. The APS function is required at least a TDM/ATM line interface side, i.e., a circuit-switched network interface side, in a network connection apparatus which interconnects the circuit-switched network and the packet-switched network respectively.

When the APS function is introduced by the redundancy configuration of "1+1" basis, two transmission lines of the active line and the standby line are provided at the circuit-switched interface side, i.e., between the network connection apparatus and the TDM/ATM apparatus, and transmits the same data simultaneously on the active line and the standby line. And, it is necessary to change over instantaneously the active line and the standby line when a failure has occurred in the active line. That is, the line used to be an active state has become a standby line having been switched and the line used to be a standby state has become an active line having been switched when changeover of the APS function has been performed under the redundancy configuration of "1+1" basis.

However, when the APS function is introduced into the system which transmits data used in the circuit-switched network on the packet-switched network, there is a problem that the APS function does not operate normally due to a concept of MAC address. This is because that MAC address is necessary information for a routing operation performed in the packet-switched network but the concept of MAC address does not exist in the circuit-switched network such as the ATM/TDM network.

SUMMARY

An exemplary object of the present invention is to provide a network connection apparatus in which the APS function can operate in an appropriate manner even if the concept of MAC address which does not exist in the circuit-switched network is used for a routing operation of the network connection apparatus.

A network connection apparatus according to an exemplary aspect of the invention, which is provided with a pair of transmission lines to interface with a circuit-switched network by a redundant configuration of 1+1 basis and interconnects between the circuit-switched network and a packet switched network, includes, a pair of line interface circuits which accommodates each transmission line provided to interface with the circuit-switched network, composes an active line and a standby line of the redundant configuration, and mutually converts data used in the circuit-switched network and a packet used in the packet-switched network; and a packet processing unit which interfaces with the packet-switched network and performs a sending and receiving process of the packet between the line interface circuit and the packet-switched network, wherein the packet processing unit transmits the packet received only from the line interface circuit of the active line to the packet-switched network, and transmits the packet received from the packet-switched network to both of the line interface circuits of the active line and the standby line, and wherein the line interface circuit acquires the packet transmitted from the packet processing unit when a destination MAC (Media Access Control) address included in the packet coincides with a first MAC address which is given to own line interface circuit or a second MAC address which is given to the other line interface circuit of pair for the redundant configuration.

A method of a network connection apparatus, which is provided with a pair of line interface circuits, which interfaces with the circuit-switched network and composes an active line and a standby line of a redundant configuration of 1+1 basis, according to an exemplary aspect of the invention includes, generating a packet used in the packet-switched network by converting data used in the circuit-switched network in the line interface circuit, and outputting the packet to a packet processing unit, which interfaces with the packet-switched network and performs a sending and receiving process of the packet between the line interface circuit and the packet-switched network; transmitting the packet inputted to the packet processing unit only from the line interface circuit of the active line to the packet-switched network; transmitting the packet received at the packet processing unit from the packet-switched network to both of the line interface circuits of the active line and the standby line; acquiring the packet transmitted from the packet processing unit at the line interface circuit when a destination MAC (Media Access Control) address included in the packet coincides with a first MAC address which is given to own line interface circuit or a second MAC address which is given to the other line interface circuit of pair for the redundant configuration; and disassembling the packet acquired in the line interface circuit to the data used in the circuit-switched network.

BRIEF DESCRIPTION OF THE DRAWINGS

Exemplary features and advantages of the present invention will become apparent from the following detailed description when taken with the accompanying drawings in which:

FIG. 5 is a flow chart illustrating an initialization operation for initializing an APS control table and a MAC address table of the network connection apparatus according to the first exemplary embodiment;

FIG. 6 is a figure showing an example of initialized contents of the APS control table of the network connection apparatus according to the first exemplary embodiment;

FIG. 8 is a figure showing an example of contents of the APS control table having been set in respective cases of "Normal", "Maintenance Change-over" and "Circuit Failure Change-over" of the ATM line of the network connection apparatus according to the first exemplary embodiment;

FIG. 19 is a flowchart illustrating a setting operation of the APS function of the network connection apparatus according to the second exemplary embodiment;

FIG. 20 is a figure showing an example of contents of the APS control table provided in a packet processing circuit in the second exemplary embodiment;

FIG. 23A is a block diagram for explaining a problem of the APS function relating to data stream of upstream direction when the redundant configuration of "1+1" basis is provided for an ATM line interface side of the network connection apparatus which interconnects the ATM line and the packet line; and FIG. 23B is a block diagram for explaining a problem of the APS function relating to data stream of downstream direction when the redundant configuration of "1+1" basis is provided for the ATM line interface side of the network connection apparatus which interconnects the ATM line and the packet line.

EXEMPLARY EMBODIMENTS

Figure 1:
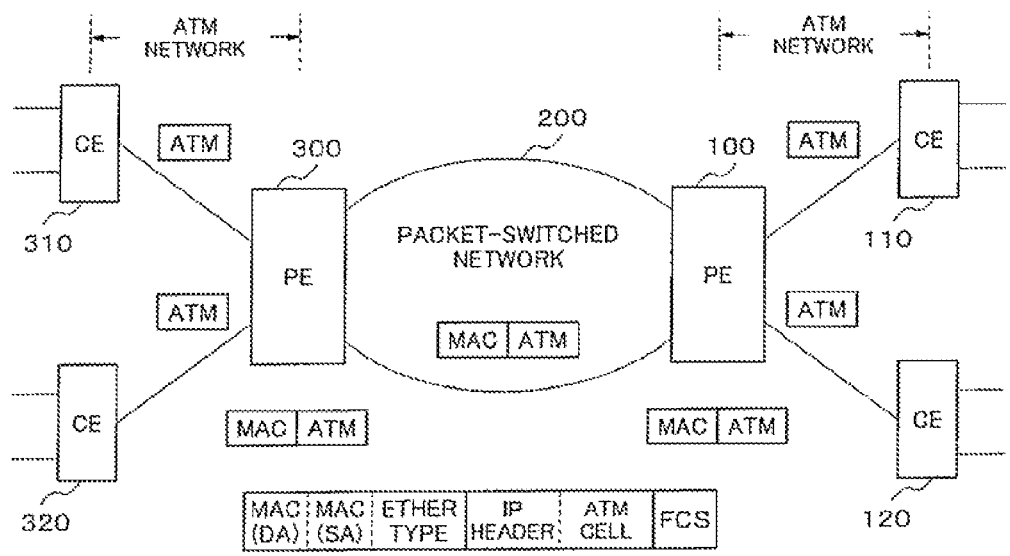
FIG. 1 is a block diagram showing a system outline according to an exemplary embodiment of the present invention.

Exemplary embodiments of the present invention will now be described in detail in accordance with the accompanying drawings, First, the problem that the APS function does not operate normally due to a concept of MAC address when the APS function is introduced into the system which transmits data used in the circuit-switched network on the packet-switched network will be described.

FIG. 23A and FIG. 23B are block diagrams for explaining the problem of the APS function when the redundant configuration of "1+1" basis is provided for an ATM line interface side of the network connection apparatus which interconnects the circuit-switched network and the packet-switched network. FIG. 23A is a block diagram for explaining the problem of the APS function relating to data stream of upstream direction, and FIG. 23B is a block diagram for explaining the problem of the APS function relating to data stream of downstream direction.

In these figures, each of PE (Provider Edge) 500 and PE 600 is a network connection apparatus. PE 500 accommodates the ATM lines which connect with CE (Customer Edge) 510, and PE 600 accommodates the ATM lines which connect with CE 610. Each of CE 510 and CE 610 is an ATM apparatus. Each of the network between PE 500 and CE 510 and the network between PE 600 and CE 610 is an ATM network. And, the network between PE 500 and PE 600 is a packet-switched network.

Here, the redundant configuration of "1+1" basis is only shown between PE 500 and CE 510 because these figures are only for explanation purpose. The redundant configuration of "1+1" basis provided for the ATM line interface side is shown by two ATM lines, one is terminated in port A of PE 500 which is assumed as an active ATM line and the other is terminated in port B of PE 500 which is assumed as a standby ATM line.

CE 510 transmits ATM cells for communicating with CE 610 and receives ATM cells transmitted from CE 610. CE 610 transmits ATM cells for communicating with CE 510 and receives ATM cells transmitted from CE 510. And, PE 500, 600 encapsulates (or assembles) an ATM cell in a packet and transmits the assembled packet in which the ATM cell is included to the packet-switched network. Also, PE 500, 600 disassembles a packet received from the packet-switched network, extracts an ATM cell from the disassembled packet, and transmits the extracted ATM cell to the ATM network.

FIG. 23A is a figure showing a path of data flow of upstream direction seen from PE 500, in other words, data is transmitted to PE 500 from CE 510, and further transmitted to PE 600 from PE 500, and reaches CE 610. FIG. 23B is a figure showing an opposite direction path of data flow, i.e., downstream direction seen from PE 500, and data is transmitted to PE 600 from CE 610, and further transmitted to PE 500 from PE 600, and reaches CE 510.

The operation expected by the APS function of the network connection apparatus is as follows.

When the APS function is provided by the redundant configuration of "1+1" basis between PE 500 and CE 510, data (ATM cell) of upstream direction should be transmitted to the respective ATM lines of the active ATM line and the standby ATM line simultaneously from CE 510 to PE 500 (refer to ATM cell 511 and ATM cell 512). PE 500 terminates the respective ATM lines of the active ATM line and the standby ATM line in port A (active) and port B (standby). PE 500 which is provided with the APS function by the redundant configuration of "1+1" basis is receiving the same data from these port A (active) and port B (standby) simultaneously.

Under normal condition, PE 500 transmits only data received from port A (active) to the packet-switched network, and discards data received from port B (standby). And, when a failure of the ATM line corresponding to the port A (active) is detected, PE 500 changes over the active ATM line and the standby ATM line at once. That is, the ATM line used to be an active state has become a standby line having been switched and the ATM line used to be a standby state has become an active line having been switched, then, received data from the port A corresponding to the standby ATM line having been switched is stopped or discarded and received data from the port B corresponding to the active ATM line having been switched is transmitted to the packet-switched network this time.

In this way, PE 500 which is provided with the APS function by the redundant configuration of "1+1" basis can keep continuity of transmission data flow on upstream direction to the packet-switched network.

With respect to downstream direction, although not being illustrated, PE 500 always transmits data received from the packet-switched network to CE 510 through both of port A (active) and port B (standby) under normal condition. Accordingly, CE 510 receives data from both of the active ATM line and the standby ATM line from PE 500. Then, under normal condition, CE 510 obtains and uses only data received from the active ATM line, and discards data received from the standby ATM line.

When a failure of the active ATM line is detected, CE 510 changes over the active ATM line and the standby ATM line at once. That is, the ATM line used to be an active state has become a standby ATM line having been switched and the ATM line used to be a standby state has become an active ATM line having been switched, then, received data from the standby ATM line having been switched which is used to be an active state is stopped or discarded and received data from the active ATM line having been switched which used to be a standby state is obtained and used in CE 510 this time.

In this way, PE 500 which is provided with the APS function by the redundant configuration of "1+1" basis can keep continuity of transmission data flow in CE 510 on downstream direction.

Thus, when the APS function is provided by the redundant configuration of "1+1" basis for the ATM line interface side, PE 500 has to transmit only data received from the active port of the ATM line interface to the packet-switched network for upstream direction. And, PE 500 has to transmit data received from the packet-switched network to both of the active port of the ATM line interface and the standby port of the ATM line interface for downstream direction.

On upstream direction, PE 500 encapsulates an ATM cell received from CE 510 in a packet and assembles a transmission packet. Then, PE 500 transmits the transmission packet in which the ATM cell is included to the packet-switched network. At that time, PE 500 uses a MAC address which is given to the port of the ATM line interface from which the ATM cell has been received as a source MAC address to be attached to the transmission packet.

A MAC address is given to each physical circuit or physical apparatus for routing a packet in the packet-switched network, and a unique MAC address is given to the respective physical circuits and physical apparatuses. The source MAC address is used to specify a physical circuit or a physical apparatus from which the packet has been originally transmitted, and the destination MAC address is used to identify a physical circuit or a physical apparatus to which the packet is terminated.

When PE 500 transmits a packet in which an ATM cell is encapsulated to the packet-switched network by a routing operation performed in PE 500, PE 500 only performs so called MAC address learning.

The MAC address learning is a function in which the source MAC address included in the packet to be transmitted is memorized corresponding with port number from which the packet has been inputted, and the memorized source MAC address and its corresponding port number are used for transmitting a received packet from the packet-switched network to a desired port on downstream direction.

Therefore, if PE 500 does not perform any discrimination between an active port and a standby port, PE 500 always transmits all packets to the packet-switched network regardless of a port state whether it is an active state or a standby state. This means that the expected operation of the APS function in which only data received from the active port should be transmitted to the packet-switched network for upstream direction cannot be realized.

On downstream direction, PE 500 performs a routing operation of the packet received from the packet-switched network based on the destination MAC address which is included in the received packet. PE 500 identifies port number of the ATM line interface as the routing destination of the received packet by comparing this destination MAC address with the source MAC address which has been learned by the MAC address learning.

However, because the MAC address given to port A (active) and the MAC address given to port B (standby) is different respectively, PE 500 cannot perform the operation of transmitting the received packet to both of port A (active) and port B (standby) which is the expected operation for downstream direction of the APS function by the redundant configuration of "1+1" basis.

Even if it can be configured so as to transmit the received packet to both of port A (active) and port B (standby), because the destination MAC address included in the received packet does not coincide with one of MAC addresses given to port A and port B, the received packet is discarded at that port. That is, if the destination MAC address of the received packet is the same as the MAC address given to the port A, the received packet which is transmitted to the port B is discarded at this port B due to mismatch of MAC address, and also, if the destination MAC address of the received packet is the same as the MAC address given to the port B, the received packet which is transmitted to the port A is discarded at this port A due to mismatch of MAC address. In addition, an X mark indicated in PE 500 of FIG. 23B means that the received packet transmitted to port B (standby) is being discarded.

Thus, when the APS function is applied to the network apparatus which interconnects the circuit-switched network and the packet-switched network, there is a problem that the APS function does not operate normally due to a concept of MAC address if the configuration of the network connection apparatus is not modified.

Next, the network connection apparatus according to an exemplary embodiment of the present invention will be described with reference to drawings.

(System Outline)

FIG. 1 is a block diagram showing a system outline according to the exemplary embodiment of the present invention.

Each of PE 100 and PE 300 is a network connection apparatus which accommodates transmission lines from CE 110, CE 120 and CE 310, CE 320 respectively. Each of CE 110, CE 120, CE 310 and CE 320 is a circuit-switched network apparatus. Each of PE 100 and PE 300 is also connected to the packet-switched network 200. The network connection apparatus interconnects the circuit-switched network and the packet-switched network 200.

Therefore, The network connection apparatus encapsulates (or assembles) data used in the circuit-switched network in a packet and transmits the packet to the packet-switched network 200. Also, the network connection apparatus disassembles a packet received from the packet-switched network 200 and extracts data used in the circuit-switched network.

Here, an ATM (Asynchronous Transfer Mode) apparatus is assumed as a circuit-switched network apparatus, therefore, each network between PE 100 and CE 110, CE 120 and between PE 300 and CE 310, CE 320 is an ATM network. Also, each transmission line between PE 100 and CE 110, CE 120 and between PE 300 and CE 310, CE 320 is an ATM line. Of course, the circuit-switched network apparatus may be a TDM (Time Division Multiplex) apparatus, each network between PE 100 and CE 110, CE 120 and between PE 300 and CE 310, CE 320 may be a TDM network, and each transmission line between PE 100 and CE 110, CE 120 and between PE 300 and CE 310, CE 320 may be a TDM line.

Also, it is assumed that the packet-switched network 200 between PE 100 and PE 300 is a packet-switched network based on the wide area Ethernet (registered trademark). Of course, it may be a packet-switched network based on MPLS (Multi-Protocol Label Switching). Hereinafter, an Ethernet (registered trademark) frame which is transmitted between PE 100 and PE 300 is collectively called a packet.

In such a system configuration, ATM cells are sent and received as data between PE 100 and CE 110, CE 120 and between PE 300 and CE 310, CE 320. Each of PE 100 and PE 300 generates a packet in which an ATM cell received from an ATM apparatus is encapsulated, and transmits the packet to the packet-switched network 200. On the other hand, each of PE 100 and PE 300 disassembles a packet received from the packet-switched network 200, extracts an ATM cell included in the packet, and transmits the extracted ATM cell to CE 110, CE 120 and CE 310, CE 320. A frame configuration of packet which is transmitted through the packet-switched network 200 includes a destination MAC address (DA) and a source MAC address (SA) as illustrated in the figure.

Figure 2:
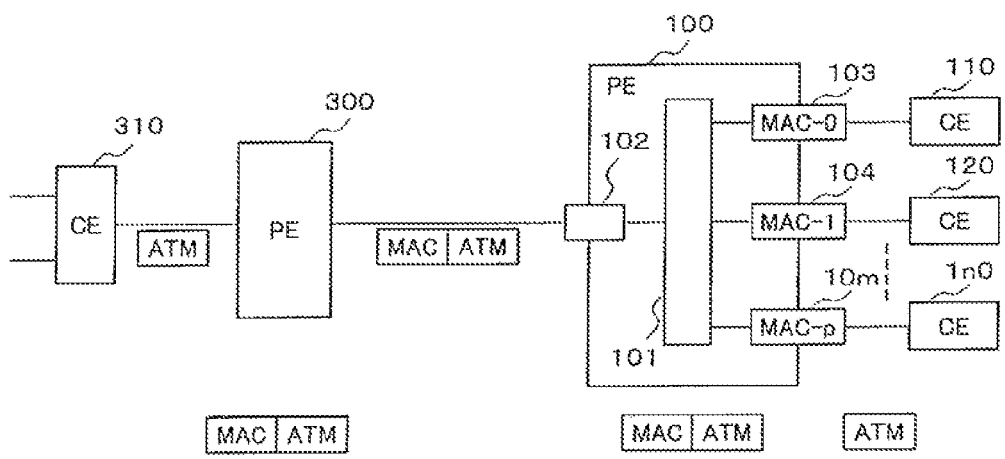
FIG. 2 is a block diagram showing an outline of connection among a specific PE (Provider Edge) according to the exemplary embodiment and the related apparatuses.

FIG. 2 is a block diagram showing an outline of connections among a specific PE (Provider Edge) 100 according to the exemplary embodiment and the related apparatuses.

When focus on PE 100, PE 100 includes ATM interface circuits 103-10m, a packet interface circuit 102 and a packet processing unit 101 as main components. Each of the ATM interface circuits 103-10m accommodates an ATM line connected to respective CE 110-1n0 which is an ATM apparatus. The packet interface circuit 102 accommodates a packet line interfaced with a packet-switched network.

Each of the ATM interface circuits 103-10n is a physical circuit which is independent from each other. A unique MAC address (MAC-0-MAC-p) is allocated and given to the respective ATM interface circuits 103-10n. An accommodation port of an ATM interface circuit can be specified by the MAC address given to the ATM interface circuit.

For example, data transmitted from CE 110 is encapsulated to a packet in the ATM interface circuit 103, and header information including a MAC address of MAC-0 as a source MAC address is added to the packet which becomes a transmission packet. The transmission packet generated in the ATM interface circuit is switched and routed in the packet processing unit 101, and is transmitted to the packet-switched network via the packet interface circuit 102. In that case, the packet processing unit 101 performs the MAC address learning and correlates the source MAC address of MAC-0 included in the transmission packet and a port number accommodating the ATM interface circuit 103 from which the transmission packet has been outputted, and memorizes this port number and its corresponding source MAC address of MAC-0.

On the other hand, a received packet which has been received via the packet interface circuit 102 from the packet-switched network is switched and routed in the packet processing unit 101, and is transmitted to one of the ATM interface circuits 103-10m corresponding to a destination MAC address included in the received packet.

At that time, the packet processing unit 101 performs a routing operation of the received packet based on correspondence relation of the source MAC address and the port number memorized in advance. In other words, the packet processing unit 101 transmits the received packet to a port whose port number is corresponding to the memorized source MAC address which coincides with the destination MAC address included in the received packet. When the destination MAC address included in the received packet does not coincide with any memorized source MAC address, the packet processing unit 101 transmits the received packet to all ports being accommodated.

In the ATM interface circuit to which the received packet has been transmitted from the packet processing unit 101, the destination MAC address included in the received packet is compared with own MAC address given to the ATM interface circuit. The ATM interface circuit acquires the received packet when the destination MAC address and own MAC address are identical each other.

For example, when the destination MAC address included in the received packet is a MAC address of MAC-1, the received packet is acquired by the ATM interface circuit 104 which has own MAC address of MAC-1. The ATM interface circuit 104 which has acquired the received packet disassembles the received packet, extracts an ATM cell stored in a data portion of the received packet, and, then, transmits the extracted ATM cell to CE 120.

(Basic Structure)

A basic structure of a network connection apparatus of the exemplary embodiment of the present invention will be described.

Figure 3:
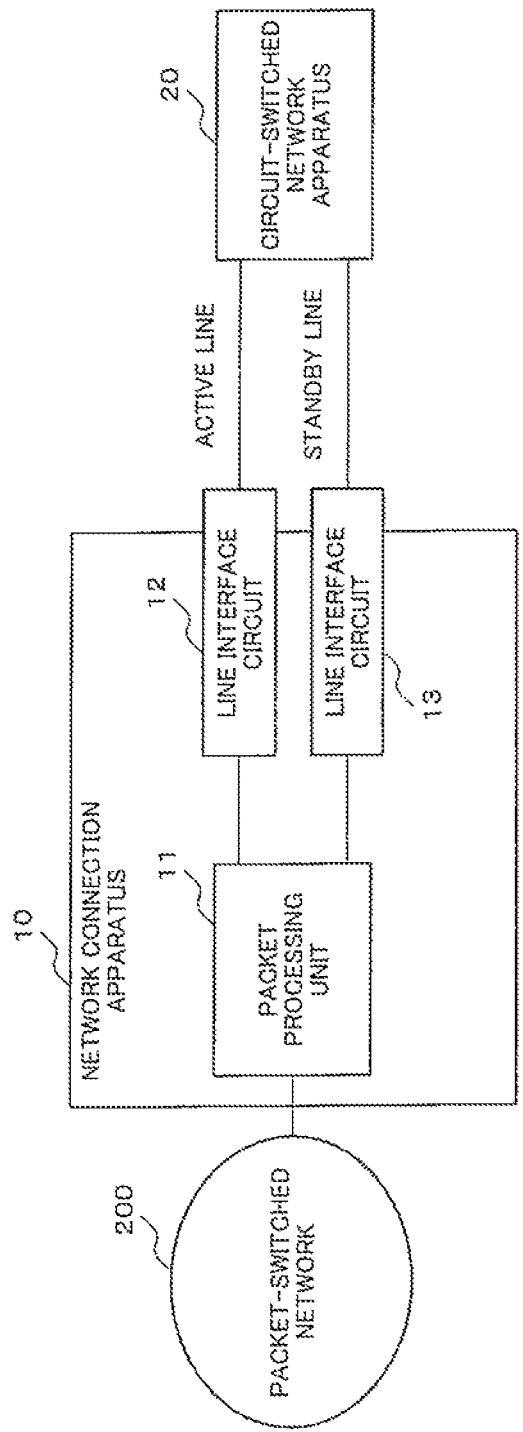
FIG. 3 is a block diagram showing a basic structure of a network connection apparatus according to the exemplary embodiment.

FIG. 3 is a block diagram showing a basic structure of a network connection apparatus according to the exemplary embodiment.

The network connection apparatus 10 includes a pair of line interface circuits 12, 13, and a packet processing unit 11.

A pair of line interface circuits 12, 13 is provided as an active and a standby corresponding to the redundancy configuration of 1+1 basis for accommodating transmission lines between the network connection apparatus 10 and a circuit-switched network apparatus 20.

The packet processing unit 11 interfaces with the packet-switched network 200 and performs processing of sending and receiving packets between the line interface circuits 103, 104 and the packet-switched network 200.

The network connection apparatus 10 interconnects between the circuit-switched apparatus 20 and the packet-switched network 200. That is, the line interface circuit accommodates transmission lines which connects to the circuit-switched network apparatus 20 including an ATM (the Asynchronous Transfer Mode) apparatus and a TDM (Time Division Multiplexing) apparatus, and includes a function for mutually converting circuit-switched network data used in the circuit-switched network apparatus 20 and a packet used in the packet-switched network 200.

The packet processing unit 11 transmits a packet outputted from the active line interface circuit to the packet-switched network 200. And, the packet processing unit 11 transmits the received packet from the packet-switched network 200 to both of the active line interface circuit and the standby line interface circuit.

At that time, the line interface circuit acquires a packet transmitted from the packet processing unit 11 when the destination MAC address included in the packet coincides with the first MAC address which is given to own line interface circuit or the second MAC address which is given to the other line interface circuit of pair for the redundant configuration of 1+1 basis. Then, the line interface circuit disassembles the packet to circuit-switched network data and transmits the data to the circuit-switched network apparatus 20.

Like this manner, only the packet outputted from the active line interface circuit is transmitted to the packet-switched network 200 for upstream direction. And, the packet received from the packet-switched network 200 is transmitted to both of the active line interface circuit and the standby line interface circuit for downstream direction.

(First Exemplary Embodiment)

The exemplary embodiment in detail will be described.

Figure 4:
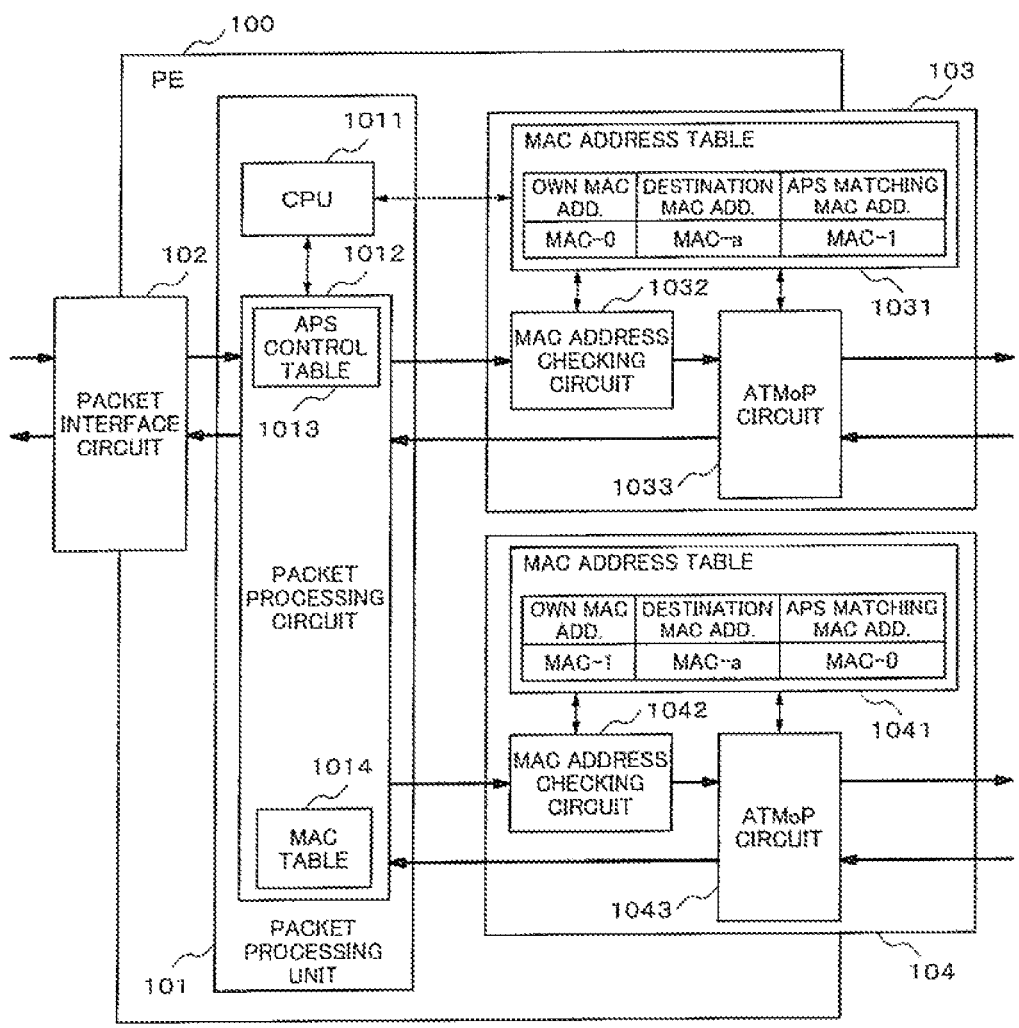
FIG. 4 is a block diagram showing a structure of the network connection apparatus according to a first exemplary embodiment.

FIG. 4 is a block diagram showing a structure of the network connection apparatus according to a first exemplary embodiment.

PE (Provider Edge) 100 which is a network connection apparatus of this exemplary embodiment includes a packet interface circuit 102, an ATM interface circuit 103, an ATM interface circuit 104 and a packet processing unit 101 as main components. The packet interface circuit 102 interfaces with the packet-switched network (not shown). Each of the ATM interface circuit 103 and the ATM interface circuit 104 accommodates an ATM line connected to an ATM apparatus (not shown) as CE (Customer Edge).

The ATM line accommodated in the ATM interface circuit 103 is assumed as an active ATM line and the ATM line accommodated in the ATM interface circuit 104 is assumed as a standby ATM line of the redundancy configuration of "1+1" basis. Therefore, the ATM interface circuit 103 is an active side ATM interface circuit and the ATM interface circuit 104 is a standby side ATM interface circuit. Hereinafter, a pair of ATM lines provided for the redundant configuration of "1+1" basis is called as "a pair of ATM lines for the APS function" and one side of the ATM lines is called as "the other ATM line of pair for the APS function".

The packet processing unit 101 includes CPU 1011 and a packet processing circuit 1012. CPU 1011 and the packet processing circuit 1012 function as an upstream direction transfer means and a downstream direction transfer means which perform respective control operations of the APS function for upstream direction and downstream direction which will be described later. Further, CPU 1011 functions not only as a packet processing apparatus, but also functions as a control apparatus of the whole of PE 100.

The packet processing circuit 1012 includes an APS control table 1013 which is used to realize the APS function and an MAC table 1014 which is used to perform a basic switching and routing operation of the packet processing unit 101.

Both of the ATM interface circuit 103 and the ATM interface circuit 104 have the same hardware configuration. The ATM interface circuit 103 includes a MAC address table 1031, an ATMoP (ATM over packet) circuit 1033 and a MAC address checking circuit 1032. The ATM interface circuit 104 includes a MAC address table 1041, an ATMoP circuit 1043 and a MAC address checking circuit 1042.

The MAC address which is used for creating MAC header information to be added to a packet and the MAC address which is referred by the operation of the APS function for downstream direction mentioned above are set to the MAC address table 103. There are three kinds of MAC address, own MAC address, a destination MAC address and an APS matching MAC address, to be set in the MAC address table 103. Own MAC address is a MAC address given to this ATM interface circuit 103 and is used as a source MAC address of the packet which is assembled in this ATM interface circuit 103. The destination MAC address is a MAC address to be attached to the packet which is assembled in this ATM interface circuit 103 for specifying an apparatus of destination to which the packet is transmitted in a packet-switched network. The APS matching MAC address is a MAC address given to the other ATM interface circuit 104 of pair for the APS function.

In other words, in the MAC address table 1031 of the ATM interface circuit 103, the MAC address of MAC-0 is set as own MAC address and the MAC address of MAC-1 is set as the APS matching MAC address which is a MAC address of the ATM interface circuit 104. Also, in the MAC address table 1041 of the ATM interface circuit 104, the MAC address of MAC-1 is set as own MAC address and the MAC address of MAC-0 is set as the APS matching MAC address which is a MAC address of the ATM interface circuit 103.

The MAC address checking circuit 1032 compares a destination MAC address included in a received packet with own MAC address or the APS matching MAC address referring to contents of the MAC address table 1031. The MAC address checking circuit 1032 transmits the received packet to the ATMoP circuit 1033 when the destination MAC address of the received packet coincides with one of the own MAC address and the APS matching MAC address set in the MAC address table 1031. The MAC address checking circuit 1032 discards the received packet when the destination MAC address of the received packet does not coincide with any of the own MAC address and the APS matching MAC address set in the MAC address table 1031.

The MAC address checking circuit 1042 in the ATM interface circuit 104 performs similar operation as above.

The ATMoP circuit 1033 assembles an ATM cell received from CE (not shown) into a packet and transmits the packet to the packet processing unit 101. The ATMoP circuit 1033 disassembles a packet received from the packet processing unit 101, extracts an ATM cell included in the disassembled packet, and transmits the extracted ATM cell to CE.

The ATMoP circuit 1043 in the ATM interface circuit 104 performs similar operation as above.

(Description of Control Tables)

The APS control table 1013 provided in the packet processing circuit 1012 and the MAC address table provided in the ATM interface circuit will be described with reference to FIGS. 5 to 8. These tables are referred when the operation of the APS function is performed.

Figure 7:
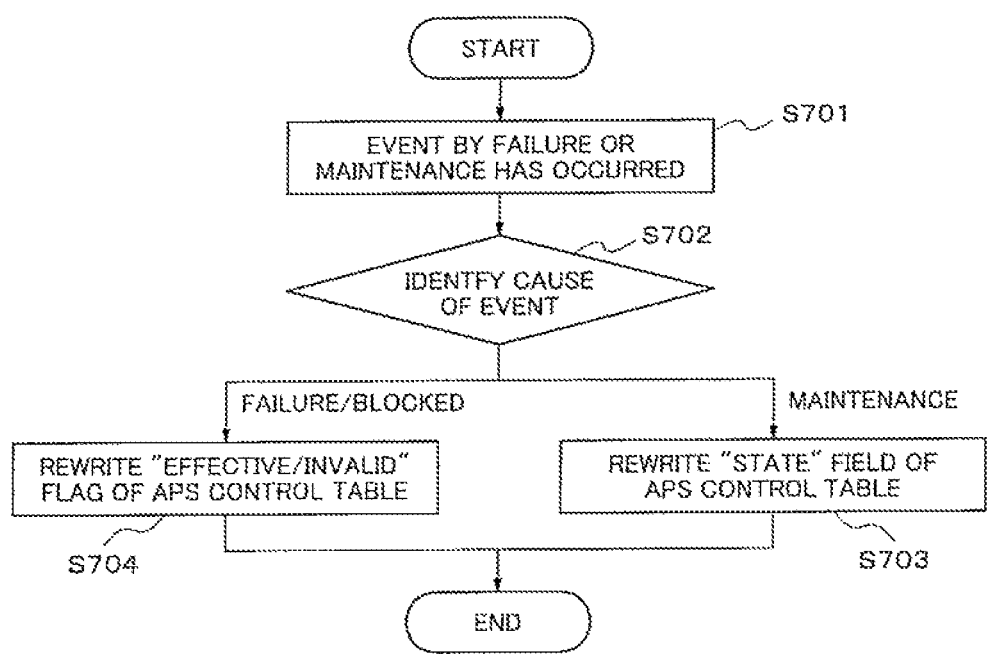
FIG. 7 is a flowchart illustrating a setting change operation for rewriting contents of the APS control table of the network connection apparatus according to the first exemplary embodiment when a changeover event has occurred on an ATM line.

FIG. 5 is a flow chart illustrating an initialization operation for initializing the APS control table 1013 and the MAC address tables 1031, 1041 of the network connection apparatus according to the first exemplary embodiment. FIG. 6 is a figure showing an example of initialized contents of the APS control table 1013 of the network connection apparatus according to the first exemplary embodiment. FIG. 7 is a flowchart illustrating a setting change operation for rewriting contents of the APS control table 1013 of the network connection apparatus according to the first exemplary embodiment when a changeover event has occurred on the ATM line. FIG. 8 is a figure showing an example of contents of the APS control table 1013 having been set in respective cases of "Normal", "Maintenance Change-over" and "Circuit Failure Change-over" of the ATM line of the network connection apparatus according to the first exemplary embodiment.

The initialization operation for initializing the MAC address tables 1031, 1041 and the APS control table 1013 will be described with reference to FIG. 5.

These MAC address tables 1031, 1041 and APS control table 1013 are initialized by an APS setting command which is inputted by maintenance personnel in advance.

Maintenance personnel inputs the APS setting command for a pair of ATM lines for the APS function with a set of parameters of a port number, an ATM interface circuit number, a MAC addresses and discrimination information of the active line or the standby line (S501).

For example, the APS setting command including the following parameters is inputted by maintenance personnel.

"Port number (0), ATM interface circuit 103, a MAC address (MAC-0) and active" and "port number (1), ATM interface circuit 104, a MAC address (MAC-1) and standby".

These parameters designate the ATM interface circuit 103 and the ATM interface circuit 104 as a pair of ATM lines for the APS function.

This means that the ATM interface circuit 103 is accommodated in the port number (0), and own MAC address (MAC-0) is given to the ATM interface circuit 103 and the ATM interface circuit 103 is used as the active ATM line. Similarly, this means that the ATM interface circuit 104 is accommodated in the port number (1), and own MAC address (MAC-1) is given to the ATM interface circuit 104 and the ATM interface circuit 104 is used as the standby ATM line.

CPU 1011 which has accepted this APS setting command sets the respective information to the APS control table 1013 provided in the packet processing circuit 1012 and respective MAC address tables 1031, 1041 provided in the ATM interface circuits 103, 104.

In this case, as shown in FIG. 6, in the APS control table 1013, an "effective/invalid" flag and each field of "matching port number" and "state" are set corresponding to own port number (S502)

The "effective/invalid" flag is APS indication information shown by a flag. The flag indicates that the APS function is "effective" or "invalid" for the corresponding port, e.g., in FIG. 6, "effective" is shown by a naught (O) and "invalid" is shown by a cross (x). The "matching port number" field indicates the port number of the other ATM interface circuit of pair for the APS function. The "state" field shows whether the state of port is "active" or "standby".

Accordingly, a naught (O) indicating "effective" is set to the "effective/invalid" flag, port number=1 is set to the "matching port number" field and "active" is set to the "state" field corresponding to the port number=0. Then, a naught (O) indicating "effective" is set to the "effective/invalid" flag, port number=0 is set to the "matching port number" field and "standby" is set to the "state" field corresponding to the port number=1.

In addition, setting information corresponding to other port numbers is also illustrated in FIG. 6.

For example, an ATM line corresponding to port number=2 is assumed that the APS function is not needed. Therefore, information shown by a cross (x) which indicates "invalid" for the APS function is set to the "effective/invalid" flag corresponding to this port number=2. And, information is not set to other fields.

For example, an ATM line corresponding to port number=3 is assumed that the other ATM interface circuit of pair for the APS function is an ATM line corresponding to port number=4, and other necessary information which shows that these ATM lines corresponding to port number=3 and port number=4 are a pair of ATM lines for the APS function is set.

On the other hand, own MAC address and the APS matching MAC address are set to the MAC address table (S503). Own MAC address is a MAC address given to own ATM interface circuit. The APS matching MAC address is a MAC address which is given to the other ATM interface circuit of pair for the APS function.

Accordingly, as shown in FIG. 4, own MAC address of MAC-0 and the APS matching MAC address of MAC-1 are set to the MAC address table 1031. And, own MAC address of MAC-1 and the APS matching MAC address of MAC-0 are set to the MAC address table 1041.

"Destination MAC address" in the MAC address table is a MAC address given to a destination party of communication for a connection using this ATM interface circuit. When "destination MAC address" is fixedly decided corresponding to each ATM interface circuit, it may be set by maintenance personnel separately. When "destination MAC address" varies for each connection, it may be acquired by an address resolution protocol before starting of communication and is set.

The APS control table 1013 will be described a little more closely with reference to FIG. 7 and FIG. 8.

FIG. 7 is a flowchart illustrating a setting change operation for rewriting contents the APS control table 1013 of the network connection apparatus according to the first exemplary embodiment when a changeover event has occurred on the ATM line. FIG. 8 is a figure showing an example of contents of the APS control table 1013 having been set in respective cases of "Normal", "Maintenance Change-over" and "Circuit Failure Change-over" of the ATM line of the network connection apparatus according to the first exemplary embodiment.

Each field of the APS control table 1013 is rewritten appropriately depending on the state of a pair of ATM lines for the APS function in order to perform the precise APS function as will be described later.

The "state" field shows whether the corresponding port is accommodating an active ATM line or a standby ATM line as mentioned before. Then, when a failure has occurred in a corresponding line, it is rewritten by information indicating that it is "failure". Changing over lines includes not only change over due to line failure, but also it includes change over due to a maintenance purpose.

Change over due to a maintenance purpose includes an operation to change an active ATM line and a standby ATM line each other, and also includes an operation to block the standby ATM line which has been changed from the active line. However, the operation to block the standby ATM line will be explained in the operation of change over due to a line failure.

Accordingly, CPU 1011 rewrites the setting contents in the APS control table 1013 by a flow shown in FIG. 7 when an event necessary for changing over lines has occurred.

When an event necessary for changing over lines has occurred (S701), CPU1011 identifies the cause of event whether it is caused by a maintenance purpose or caused by a line failure (S702).

When a failure has occurred in an active ATM line, it is necessary to change to use data flown from a current standby ATM line for upstream direction. On the other hand, it is necessary to flow data only to the current standby ATM line for downstream direction.

Therefore, CPU 1011 rewrites contents of the APS control table 1013 corresponding to a pair of ATM lines for the APS function relating to the failure to indicate that it is being a failure condition (S704). In other words, CPU 1011 sets information shown by a cross (x) indicating "invalid" to the respective "effective/invalid" flags corresponding to each port number of relating pair of ATM lines for the APS function.

It is not necessary to change the setting content of the "state" field, because this field is not referred when the "effective/invalid" flag has been set to "invalid".

However, CPU 1011 may set the "state" field corresponding to the port number (port number=0) which used to be "active" to "failure/blocked", and may set the "state" field corresponding to the port number (port number=1) which used to be "standby" to "active" as shown in the APS control table 1013 corresponding to the case of "Circuit Failure Change-over" of FIG. 8. Thus, when the APS control table 1013 has seen set like this manner, it will be enough only to set the "state" field corresponding to the port number=0 to "standby" in a table setting operation of the APS control table performed after restoration of failure. This matter will be described later when description will be made for an operation with reference to FIGS. 9 to 14. Further, when a standby ATM line after the maintenance change over is made a blocked condition, the corresponding "state" field is set to "blocked" instead of setting to "standby".

When the event for changing over lines has occurred due to a maintenance purpose, it is necessary to change to use data flown from the current standby ATM line, which will become an active ATM line after change over, for upstream direction.

On the other hand, it is necessary to flow data to both of the active ATM line, which used to be a standby ATM line, and the standby ATM line, which used to be an active ATM line, for downstream direction.

Therefore, CPU 1011 rewrites "active" and "standby" in the respective "state" fields of the APS control table 1013 corresponding to a pair of ATM lines for the APS function relating to this maintenance work (S703). That is, CPU 1011 rewrites the "state" field corresponding to the port number=0, which used to be "active", to "standby" and rewrites the "state" field corresponding to the port number=1, which used to be "standby", to "active" respectively.

FIG. 8 illustrates the respective contents in the APS control table 1013 corresponding to the port number 0 and the port number 1 in each case.

In case of "Normal", it shows the same contents which have been set in the APS control table 1013 by using the APS setting command at the time of the initialization operation. In case of "Maintenance Change-over", it shows the contents of the APS control table 1013 after change over due to a maintenance purpose has been performed. In case of "Circuit Failure Change-over", it shows the contents of the APS control table 1013 after change over caused by a line failure has been performed.

(Operation)

Next, an operation of the APS function of the network connection apparatus using the APS control table 1013 and the MAC address tables 1031, 1041 will be described with reference to the block diagrams of FIGS. 9 to 14 and the flowcharts of FIGS. 15 to 17.

Figure 9:
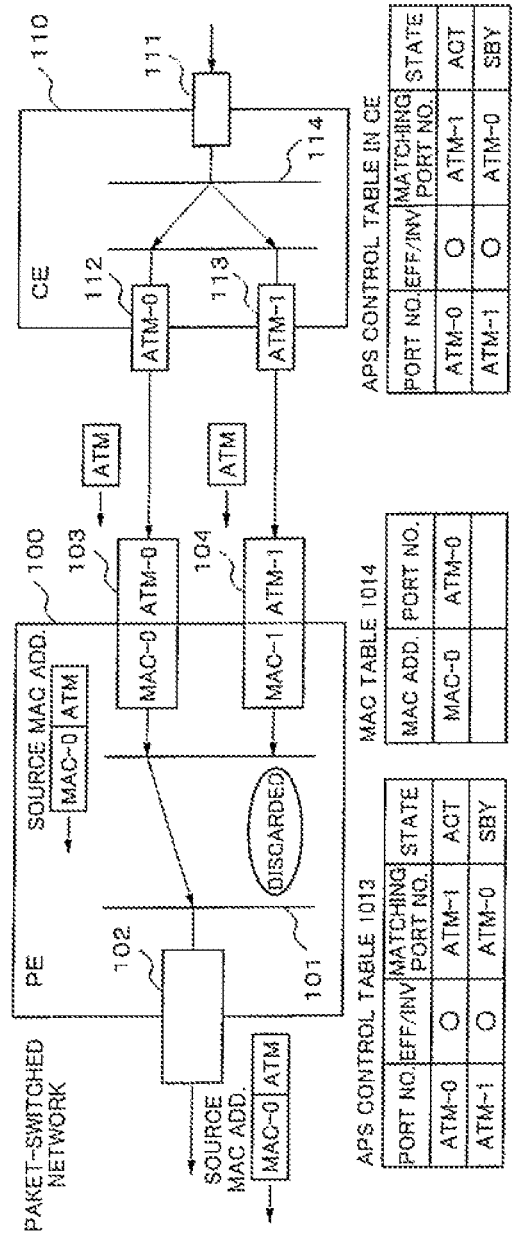
FIG. 9 is a block diagram for explaining an operation of the APS function relating to data stream of upstream direction in case of "Normal" according to the first exemplary embodiment.
Figure 10:
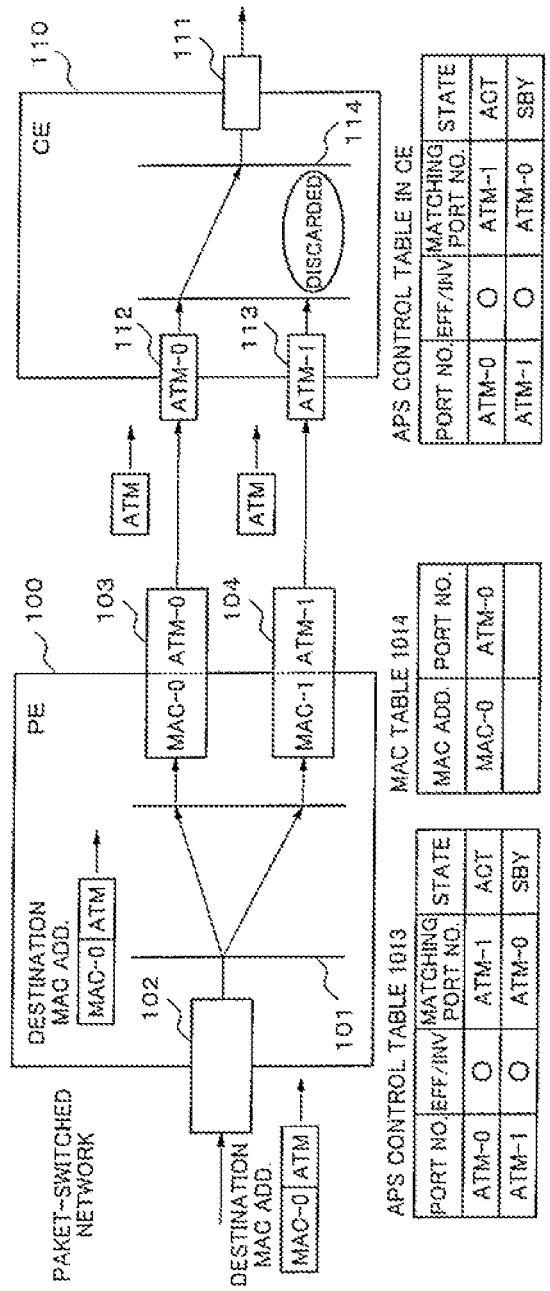
FIG. 10 is a block diagram for explaining an operation of the APS function relating to data stream of downstream direction in case of "Normal" according to the first exemplary embodiment.

FIG. 9 is a block diagram for explaining an operation of the APS function relating to data stream of upstream direction in case of "Normal" according to the first exemplary embodiment. FIG. 10 is a block diagram for explaining an operation of the APS function relating to data stream of downstream direction in case of "Normal" according to the first exemplary embodiment.

Figure 11:
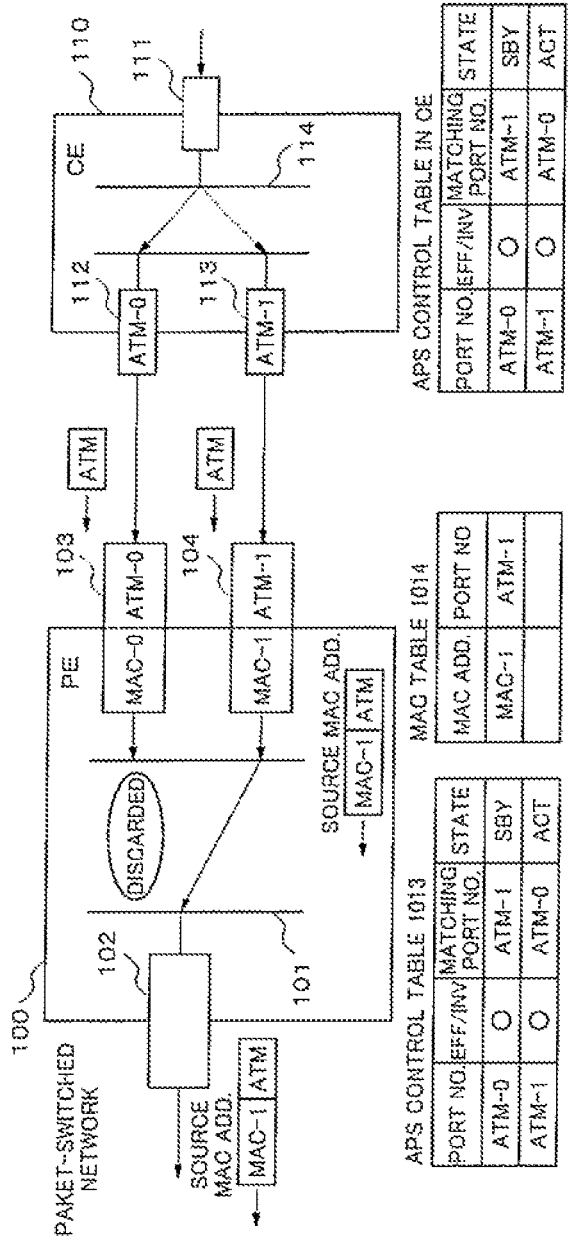
FIG. 11 is a block diagram for explaining an operation of the APS function relating to data stream of upstream direction in case of "Maintenance Change-over" according to the first exemplary embodiment.
Figure 12:
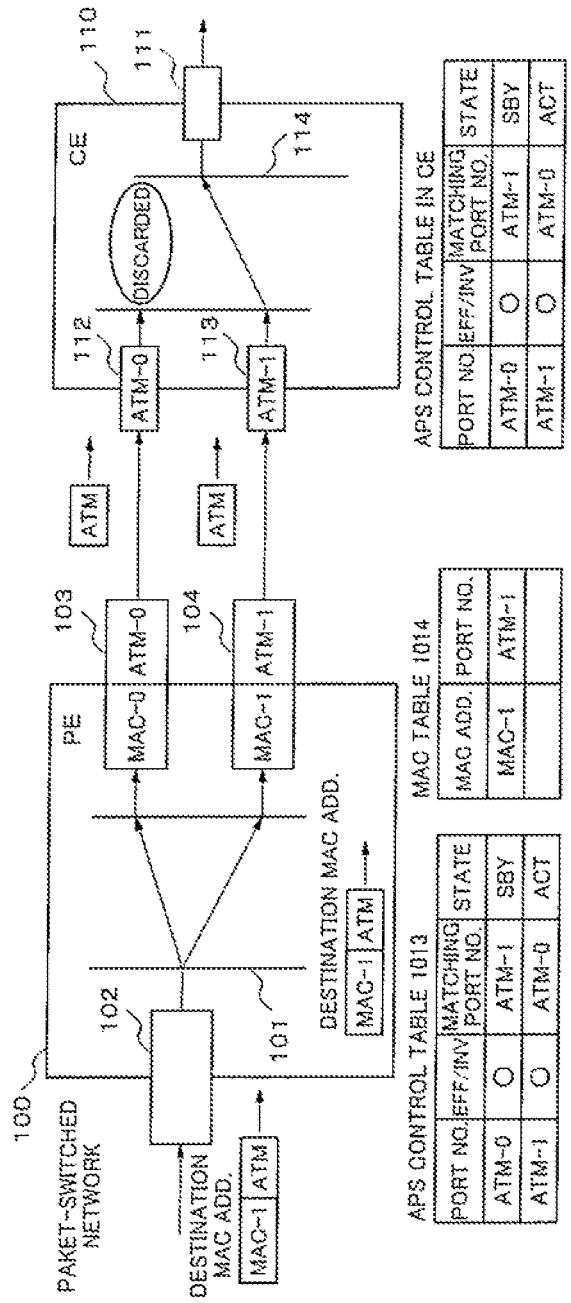
FIG. 12 is a block diagram for explaining an operation of the APS function relating to data stream of downstream direction in case of "Maintenance Change-over" according to the first exemplary embodiment.

FIG. 11 is a block diagram for explaining an operation of the APS function relating to data stream of upstream direction in case of "Maintenance Change-over" according to the first exemplary embodiment. FIG. 12 is a block diagram for explaining an operation of the APS function relating to data stream of downstream direction in case of "Maintenance Change-over" according to the first exemplary embodiment.

Figure 13:
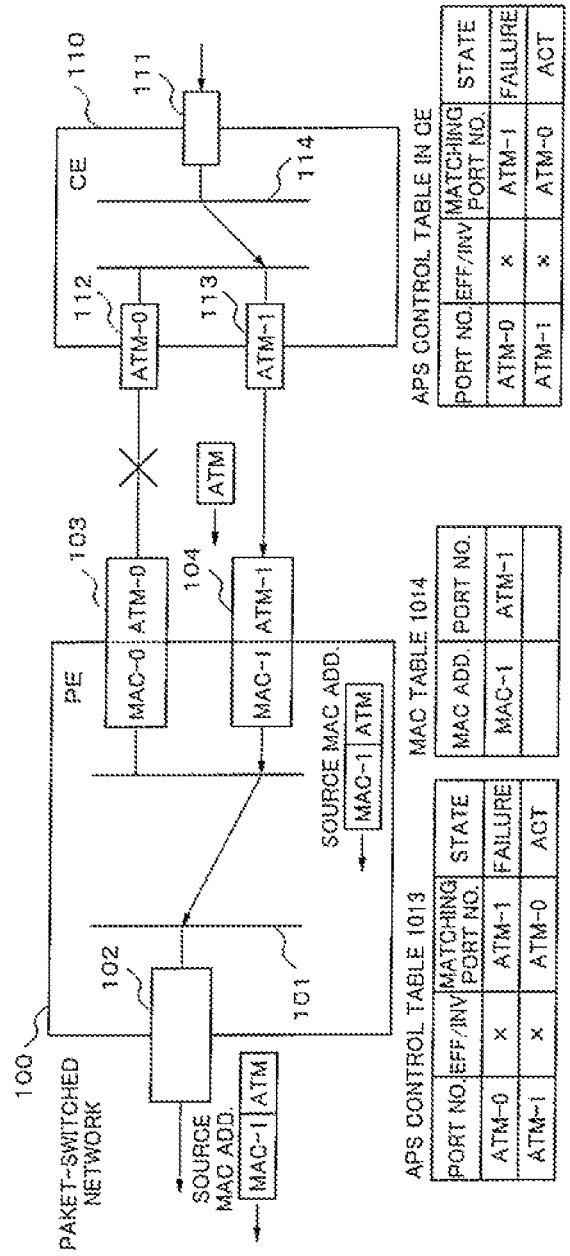
FIG. 13 is a block diagram for explaining an operation of the APS function relating to data stream of upstream direction in case of "Circuit Failure Change-over" according to the first exemplary embodiment.
Figure 14:
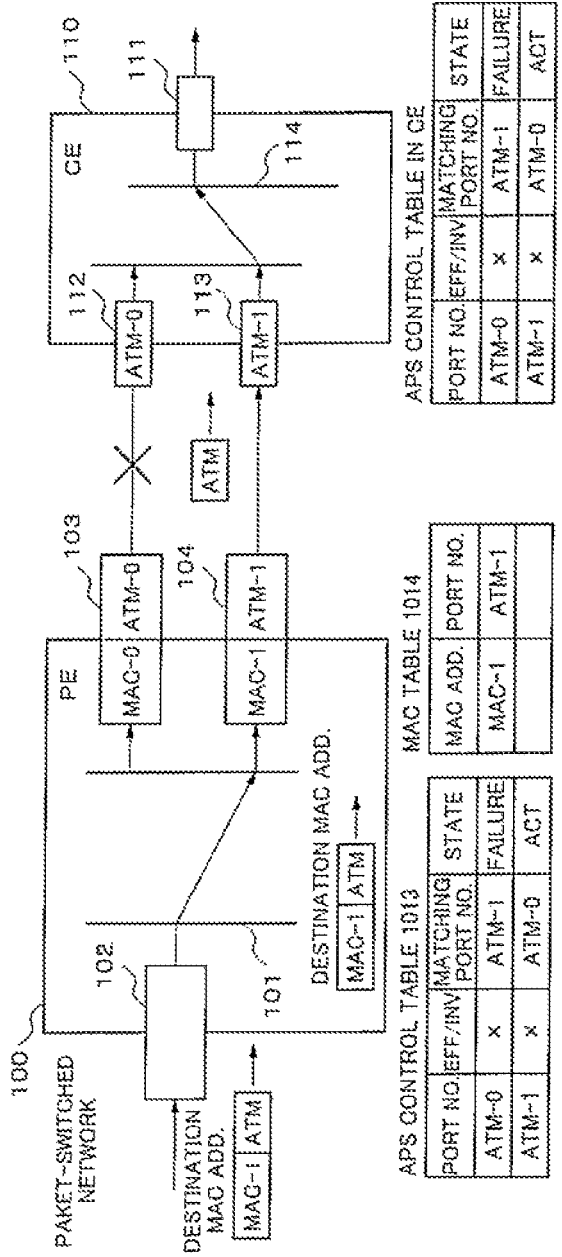
FIG. 14 is a block diagram for explaining an operation of the APS function relating to data stream of downstream direction in case of "Circuit Failure Change-over" according to the first exemplary embodiment.

FIG. 13 is a block diagram for explaining an operation of the APS function relating to data stream of upstream direction in case of "Circuit Failure Change-over" according to the first exemplary embodiment. FIG. 14 is a block diagram for explaining an operation of the APS function relating to data stream of downstream direction in case of "Circuit Failure Change-over" according to the first exemplary embodiment.

Here, upstream direction is the direction where data is transmitted to the packet-switched network (not shown) via PE 100 from CE 110, and data flow of upstream direction is a flow indicated by an arrow to the left side from the right side. And, downstream direction is the direction where data received at PE 100 from the packet-switched network (not shown) is transmitted to CE 110, and data flow of downstream direction is a flow indicated by an arrow to the right side from the left side.

The structure for providing the APS function by the redundant configuration of "1+1" basis needs a pair of transmission lines of the active ATM line and the standby ATM line, and the same data is transmitted to the respective transmission lines simultaneously. In FIGS. 9 to 14, the ATM interface circuit 103 is provided for the active ATM line and the ATM interface circuit 104 is provided for the standby ATM line between PE 100 and CE 110. In PE 100, the port number of ATM-0 is given to the active ATM line and the port number of ATM-1 is given to the standby ATM line. The same port number is given to respective ATM lines in CE 110 side.

Figure 15:
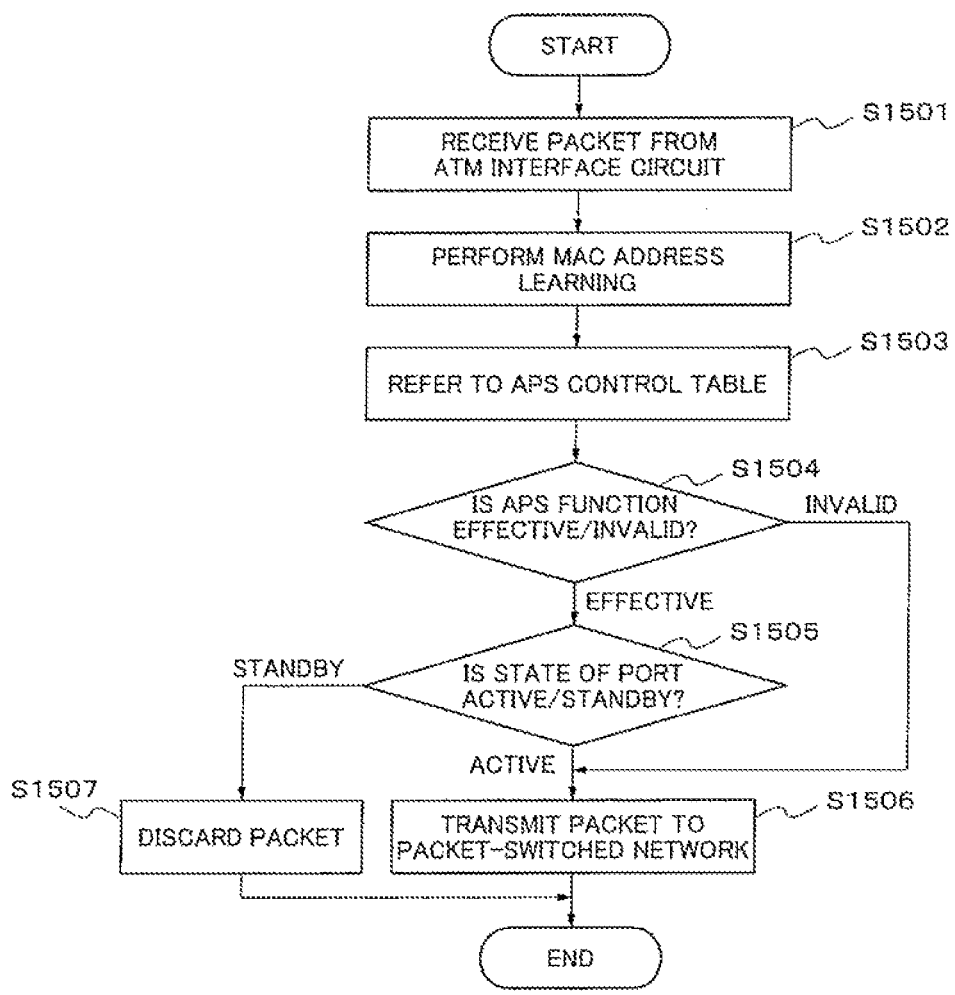
FIG. 15 is a flowchart illustrating an operation of a packet processing unit at the time of data transmission to the packet-switched network in the network connection apparatus according to the first exemplary embodiment.

FIG. 15 is a flowchart illustrating an operation of the packet processing unit 101 at the time of data transmission to the packet-switched network in the network connection apparatus according to the first exemplary embodiment. FIG. 16 is a flowchart illustrating an operation of the packet processing unit 101 at the time of data reception from the packet-switched network in the network connection apparatus according to the first exemplary embodiment. FIG. 17 is a flowchart illustrating an operation of the ATM interface circuit 103 at the time of data reception from the packet processing unit 101 in the network connection apparatus according to the first exemplary embodiment.

(Operation in Case of "Normal")

First, the operation of the APS function in case of "Normal (or at the time of initialization)" will be described with reference to FIG. 9 and FIGS. 15 to 17.

The APS function for upstream direction will be described with reference to FIG. 9.

It is assumed that each ATM interface circuit has the same port number (ATM-0/ATM-1) given to each ATM line. In other words, the ATM interface circuit 103 has the port number of ATM-0. And, the ATM interface circuit 104 has the port number of ATM-1.

CE 110 receives ATM cells via a line interface circuit 111 from an apparatus located in the lower hierarchy (not shown). CE 110 transmits the received ATM cells simultaneously to both of the ATM interface circuit 112 and the ATM interface circuit 113 provided in CE 110 which are connected with PE 100 by the redundant configuration of "1+1" basis. CE 110 may be an ATM terminal, and ATM cells to be transferred to PE 100 may be created by CE 110 itself.

Here, the ATM interface circuit 112 of CE 110 is connected to the ATM interface circuit 103 of PE 100, and the ATM interface circuit 113 of CE 110 is connected to the ATM interface circuit 104 of PE 100. In other words, CE 110 refers to an APS control table provided in CE 110, distinguishes a pair of ATM interface circuits (active and standby of the redundant configuration), copies the ATM cells to be transmitted and transmits them to the respective ATM interface circuits.

The ATM interface circuit 103/104 of PE 100 generates a transmission packet including an ATM cell received from an ATM line which is connected to the ATM interface circuits 112/113 of CE 110. The ATMoP circuit described in FIG. 4 generates the transmission packet in each ATM interface circuit 103/104. Here, the transmission packet generated in the ATM interface circuit 103 includes source MAC address of MAC-0, and the transmission packet generated in the ATM interface circuit 104 includes source MAC address of MAC-1. This means that the MAC address of MAC-0 is a MAC address which is given to the ATM interface circuit 103, and the MAC address of MAC-1 is a MAC address which is given to the ATM interface circuit 104.

It is noted that in the description hereinafter, it is not discriminated between the packet processing unit 101 and the packet processing circuit 1012. As the packet processing circuit 1012 is included in the packet processing unit 101 and not shown in the relating figures, only the packet processing unit 101 is described including meaning of the packet processing circuit 1012.

These transmission packets are transmitted to the packet processing unit 101. That is, the transmission packet having source MAC address of MAC-0 is outputted from the ATM interface circuit 103 to the packet processing unit 101, and the transmission packet having source MAC address of MAC-1 is outputted from the ATM interface circuit 104 to the packet processing unit 101.

The packet processing unit 101 is provided with the APS control table 1013 in which the APS indication information (an "effective/invalid" flag), a matching port number and state information are stored corresponding to each port number of the ATM interface circuit in advance. As described above, the APS indication information indicates whether the APS function is effective or invalid, and the matching port number indicates the port number of the other ATM interface circuit of pair for the APS function. And, the state information indicates whether a state of the corresponding ATM line is an active state, a standby state, a blocked state or a failure state.

For example, it is supposed that the ATM interface circuit 103 is corresponding to the active ATM line and the ATM interface circuit 104 is corresponding to the standby ATM line, and they are a pair of ATM lines for the APS function. In this case, the APS control table 1013 is set as follows:

corresponding to the port number of ATM-0, "effective" or a naught (O) is set to the APS indication information (the "effective/invalid" flag), "ATM-1" is set to the matching port number, and "active" is set to the state information; and corresponding to the port number of ATM-1, "effective" or a naught (O) is set to the APS indication information (the "effective/invalid" flag), "ATM-0" is set to the matching port number, and "standby" is set to the state information.

The packet processing unit 101 learns correspondence of the source MAC address included in header information on the transmission packet received from the ATM interface circuit and the port number of the ATM interface circuit from which the transmission packet has been received (MAC address learning). And, the packet processing unit 101 further refers to the APS control table 1013 by using the port number identified in the MAC address learning, and discriminates whether the port number corresponds to the active ATM line or the standby ATM line.

As the result of the discrimination, the packet processing unit 101 transmits the transmission packet received from the port number to the packet interface circuit 102 only when the port number corresponds to the active ATM line. And, the packet processing unit 101 discards the transmission packet received from the port number when the port number corresponds to the standby ATM line.

Here, information for discriminating "active" or "standby" may be simplified by only setting a flag which shows "active". In the figure, a naught (O) shows "active".

By performing such processing as above, even if ATM cells are being transmitted simultaneously via both of ATM lines provided for the active ATM line and the standby ATM line of the redundant configuration of "1+1" basis, only a transmission packet corresponding to the active ATM line is transmitted to the packet-switched network through the packet interface circuit 102.

FIG. 15 is a flowchart illustrating an operation of the packet processing unit 101 at the time of data transmission in the normal case.

The packet processing unit 101 receives a packet from the ATM interface circuit (S1501). The packet processing unit 101 performs the MAC address learning which correlates the source MAC address included in the received packet and the port number from which the packet has been received and stores the correlated information in the MAC table 1014 (S1502).

At that time, the packet processing unit 101 refers to the APS control table 1013 by using the port number identified in the MAC address learning (S1503), and identifies the validity of the APS function set in the APS control table 1013 corresponding to the port number (S1504). When the APS function is effective, the packet processing unit 101 discriminates whether the port identified by the MAC address learning is corresponding to the active ATM line or the standby ATM line (S1505).

As a result of this discrimination, when the port from which the packet has been received is corresponding to the active ATM line, the packet processing unit 101 transmits the packet to the packet-switched network via the packet interface circuit 102 (S1506).

On the other hand, as a result of the discrimination, when the port from which the packet has been received is corresponding to the standby ATM line, the packet processing unit 101 discards the packet (S1507). And the packet processing unit 101 eliminates the correlated information of the source MAC address and the port number corresponding to the standby ATM line which was stored in the MAC table 1014 by the operation of MAC address learning.

In addition, it may be possible to perform the MAC address learning later. In this case, the packet processing unit 101 may only identify the port number that has transmitted a packet in S1502. And, the packet processing unit 101 discards the packet if the identified port is corresponding to the standby ATM line with reference to the APS control table 1013. Then, the packet processing unit 101 may perform the MAC address learning only for the packet which has been received from the port corresponding to the active ATM line with reference to the APS control table 1013.

More detail operation will be described with reference to FIG. 9.

The source MAC address of MAC-0 and the port number of ATM-0 are correlated for the packet received from the port number of ATM-0. And, referring to the port number of ATM-0 in the APS control table 1013, "effective" is set to the "effective/invalid" flag, then, the "state" field is further referred to. Because the "state" field is set to "active", the packet processing unit 101 transmits this packet to the packet-switched network via the packet interface circuit 102.

On the other hand, the source MAC address of MAC-1 and the port number of ATM-1 are correlated for the packet received from the port number of ATM-1 similarly. And, referring to the port number of ATM-1 in the APS control table 1013, "effective" is set to the "effective/invalid" flag, then, the "state" field is further referred to. Because the "state" field is set to "standby", the packet processing unit 101 discards this packet.

In this way, the network connection apparatus according to the first exemplary embodiment can carry out control of packet transmission for upstream direction which transmits only a packet corresponding to the active ATM line to the packet-switched network even if ATM cells are being transmitted simultaneously via a pair of ATM lines provided for the active ATM line and the standby ATM line of the redundant configuration of "1+1" basis.

Next, an operation of the APS function for downstream direction will be described with reference to FIG. 10.

PE of a destination party (not shown) of the communication receives the packet transmitted from PE 100 through the packet-switched network. This packet received at PE of the destination party was generated in the ATM interface circuit which is corresponding to the active ATM line of PE 100 as mentioned above, and the source MAC address of MAC-0 was included in the packet.

Therefore, when PE of the destination party responds to the packet from PE 100, PE of the destination party transmits a responding packet to PE 100 by including the source MAC address of MAC-0 as a destination MAC address in the responding packet. That is, the responding packet received at PE 100 from PE of the destination party through the packet-switched network includes the destination MAC address of MAC-0 which is the same MAC address as the source MAC address set to the packet which has been transmitted from PE 100 to PE of the destination party.

PE 100 receives this packet (i.e., a responding packet) from PE of the destination party. Then, the packet processing unit 101 of PE 100 performs switching and routing operations of the received packet in which the received packet is transmitted to desired ATM interface circuit according to the destination MAC address included in the received packet.

The packet processing unit 101 compares the destination MAC address included in the received packet with the source MAC address being stored in the MAC table 1014. And, when the destination MAC address included in the received packet coincides with the source MAC address stored in the MAC table 1014, the packet processing unit 101 identifies the port number which is being stored in the MAC table 1014 in association with the source MAC address.

Next, the packet processing unit 101 refers to the APS control table 1013 and discriminates the APS indication information (the "effective/invalid" flag) corresponding to the port number identified at the MAC table 1014. When "effective" is set as the APS indication information, the packet processing unit 101 obtains a port number registered as the matching port number in the APS control table 1013.

Then, the packet processing unit 101 transmits the received packet to both of the ATM interface circuits corresponding to the port number identified at the MAC table 1014 and the port number obtained with reference to the APS control table 1013. At that time, the packet processing unit 101 copies the received packet and transmits the same received packet to respective two ports.

Figure 16:
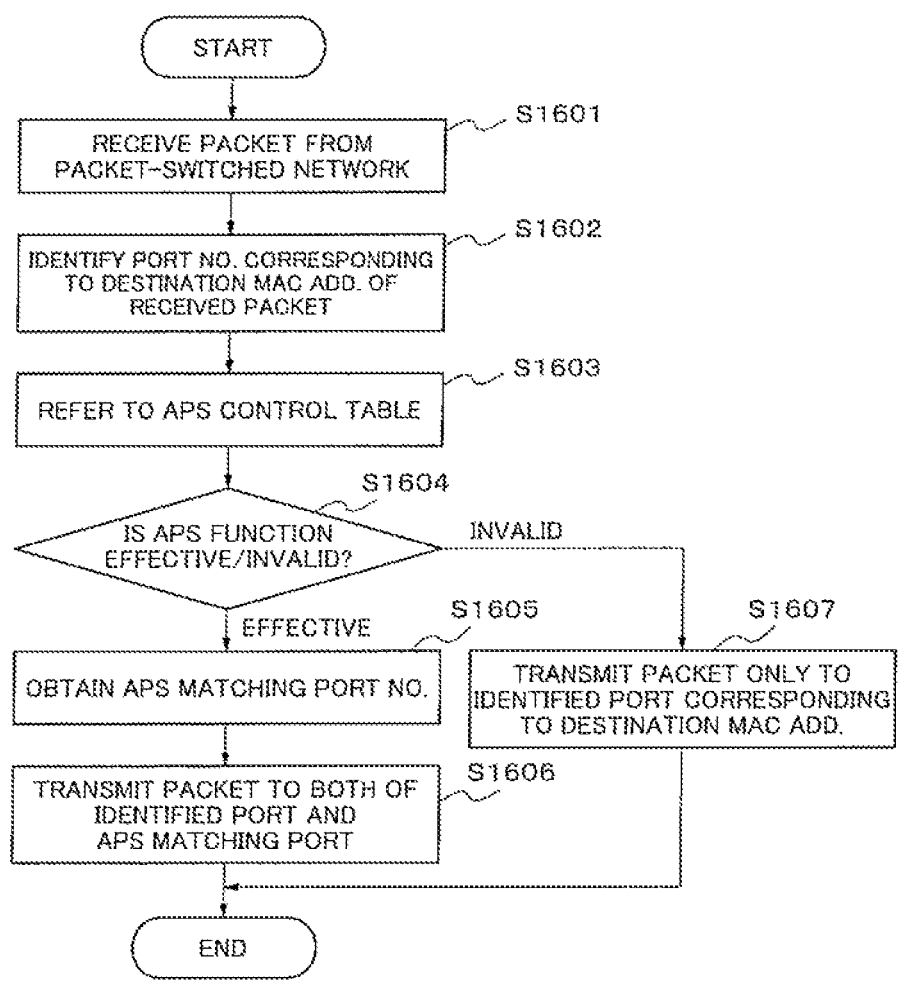
FIG. 16 is a flowchart illustrating an operation of the packet processing unit at the time of data reception from the packet-switched network in the network connection apparatus according to the first exemplary embodiment.

FIG. 16 is a flowchart illustrating an operation of the packet processing unit 101 of this time.

The packet processing unit 101 receives a packet from the packet-switched network (S1601). This packet is the responding packet transmitted by PE of the destination party as described above, and the destination MAC address of MAC-0 is included in this packet.

The packet processing unit 101 identifies corresponding port number of ATM-0 stored in the MAC table 1014 from the destination MAC address of MAC-0 included in the received packet (S1602). That is, the destination MAC address of MAC-0 included in the received packet coincides with the source MAC address of MAC-0 being stored in the MAC table 1014. Then, the port number of ATM-0 is derived from the source MAC address of MAC-0 because the port number is being stored in association with the source MAC address in the MAC table 1014.

Next, the packet processing unit 101 refers to the APS control table 1013 and confirms necessary control operation to be performed for its identified port number of ATM-0 (S1603).

Because "effective" is set to the "effective/invalid" flag corresponding to the port number of ATM-0, the packet processing unit 101 obtains the matching port number of ATM-1 which corresponds to the port number of the other ATM line of pair for the APS function (S1605).

Then, the packet processing unit 101 transmits the received packet to both of ports having the port numbers of ATM-0 and ATM-1 which correspond to a pair of ATM lines for the APS function (S1606).

If "invalid" is set to the "effective/invalid" flag. The packet processing unit 101 transmits the received packet to only the port having the port number of ATM-0 identified in the MAC table 1014 (31607).

In this way, the packet processing unit 101 can transmit the received packet to both of the ATM interface circuits which are provided for an active and a standby of the redundant configuration of "1+1" basis.

Next, an operation of the ATM interface circuit will be described.

The ATM interface circuit compares the destination MAC address included in the packet transmitted from the packet processing unit 101 and own MAC address which is given to own ATM interface circuit by using the MAC address checking circuit. And, the ATM interface circuit acquires the packet only when those are identical. Even when those are not identical, the ATM interface circuit acquires the packet when the destination MAC address coincides with the APS matching MAC address which is the MAC address given to the other ATM interface circuit of pair for the APS function.

Accordingly, with respect to the active ATM interface circuit 103, the packet is acquired because the destination MAC address of MAC-0 coincides with own MAC address (MAC-0) of the ATM interface circuit 103. Then, the ATM interface circuit 103 extracts an ATM cell from the acquired packet by using the ATMoP circuit 1033 and transmits the extracted ATM cell to the ATM interface circuit 112 of CE 110 through the active ATM line.

On the other hand, with respect to the ATM interface circuit 104 which is the other ATM interface circuit of pair for the APS function, the MAC address of (MAC-0) of the ATM interface circuit 103 is registered in the MAC address table 1041 as the APS matching MAC address in advance. Therefore, even when a packet having the destination MAC address of MAC-0 which is different from own MAC address of MAC-1 is transmitted, the MAC address checking circuit 1042 of the ATM interface circuit 104 detects coincidence of the MAC address. Then, the ATM interface circuit 104 acquires this packet. The ATM interface circuit 104 which has acquired the packet extracts an ATM cell from the acquired packet by using the ATMoP circuit 1043 and transmits the extracted ATM cell to the ATM interface circuit 113 of CE 110 through the standby ATM line.

Figure 17:
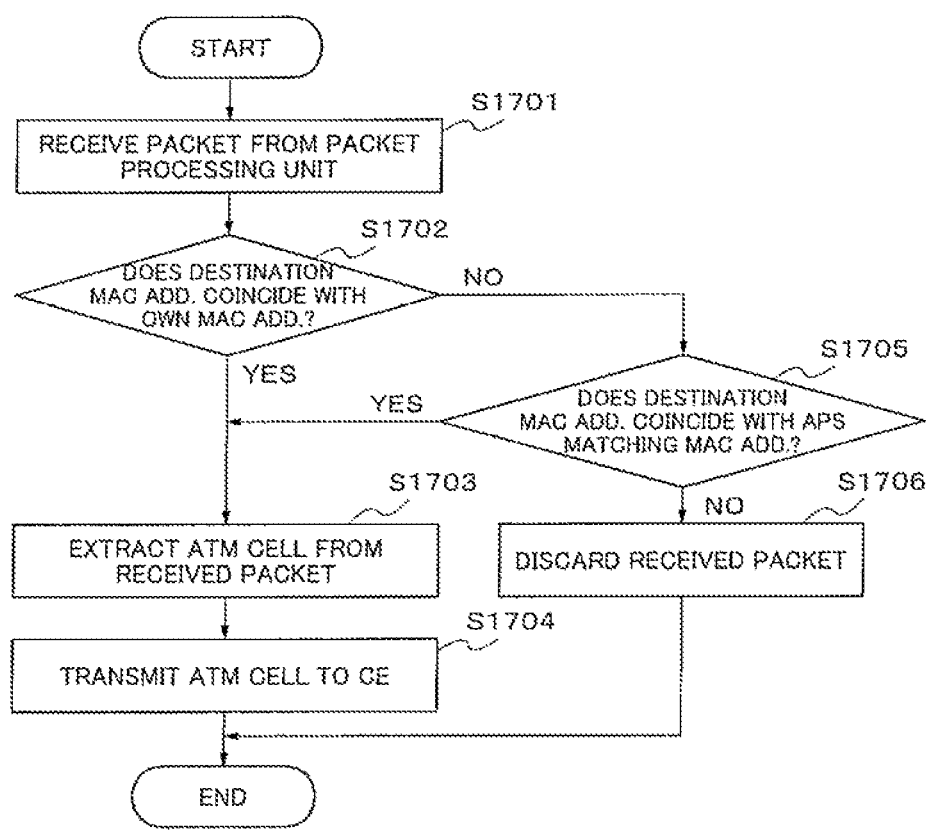
FIG. 17 is a flowchart illustrating an operation of an ATM interface circuit at the time of data reception from the packet processing unit in the network connection apparatus according to the first exemplary embodiment.

FIG. 17 is a flowchart illustrating the operation of the ATM interface circuit of this time.

The ATM interface circuit receives a packet transmitted from the packet processing unit 101, and inputs the received packet into the MAC address checking circuit (S1701).

The MAC address checking circuit refers to the MAC address table in the ATM interface circuit, and compares whether the destination MAC address included in the received packet coincides with own MAC address set in the MAC address table (S1702).

As a result of the comparison, if the destination MAC address coincides with own MAC address, the received packet is transferred to the ATMoP circuit from MAC address checking circuit. The ATMoP circuit disassembles the received packet, and extracts an ATM cell included in the received packet (S1703). Then, the extracted ATM cell is transmitted to CE 110 (S1704).

On the other hand, as a result of the comparison, if the destination MAC address does not coincide with the own MAC address, the MAC address checking circuit, then, compares whether it coincides with the APS matching MAC address or not (S1705).

When the destination MAC address coincides with the APS matching MAC address in the comparison operation of S1705

(S1705, YES), the received packet is transferred to the ATMoP circuit from MAC address checking circuit. The ATMoP circuit disassembles the received packet, and extracts an ATM cell included in the received packet (S1703), and transmits the extracted ATM cell to CE 110 (S1704).

When the destination MAC address does not coincide with the APS matching MAC address even in the comparison of S1705 (S1705, NO), the received packet is discarded in the MAC address checking circuit (S1706).

In this way, for downstream direction, PE 100 can transmit the ATM cell to both of the active ATM line and the standby ATM line provided for the redundant configuration of "1+1" basis.

CE 110 receives the ATM cell from both of the ATM interface circuit 112 and the ATM interface circuit 113. However, by the APS control table provided in CE 110, CE 110 can distinguish that the ATM interface circuit 112 corresponds to the active ATM line. Therefore, CE 110 transmits only the ATM cell received from the ATM interface circuit 112 to the apparatus located in the lower hierarchy (not shown), and CE 110 discards the ATM cell received from the ATM interface circuit 113.

(Operation in Case of "Maintenance Change-Over")

Next, an operation of the APS function when the maintenance change-over has performed between an active ATM line and a standby ATM line will be described with reference to FIG. 11.

FIG. 11 is a block diagram for explaining an operation of the APS function relating to data stream of upstream direction in case of "Maintenance Change-over" according to the first exemplary embodiment. FIG. 12 is a block diagram for explaining an operation of the APS function relating to data stream of downstream direction in case of "Maintenance Change-over" according to the first exemplary embodiment.

Maintenance change-over means changes over an active line and a standby line each other for the maintenance purpose of various facilities. When the maintenance is performed for checking, repairing and replacing hardware, the maintenance personnel makes a standby line, which used to be an active line and has been changed over, blocked condition prior to start such a work in order to stop traffic flowing into the standby line. The maintenance change-over is carried out generally by the maintenance command which is put in by the maintenance personnel.

Here, only the operation for changing over the active line and the standby line will be described.

When the maintenance personnel has put the maintenance command for changing over the lines for the maintenance purpose, processing explained with reference to FIG. 7 is carried out. In other words, by processing of S703 of FIG. 7, the "state" field of the corresponding port number of the APS control table is rewritten. As a result, the "state" field corresponding to the port number of ATM-0 which used to be "active" is rewritten to "standby" and the "state" field corresponding to the port number of ATM-1 which used to be "standby" is rewritten to "active".

When the APS control table has been rewritten like this manner, the same operation as explained with reference to FIG. 9 and FIGS. 15 to 17 is performed by reversing conditions of "active" and "standby" like that the active line is the port number of ATM-1 and the standby line is the port number of ATM-0.

In other words, the packet processing unit 101 refers to the APS control table 1013 and transmits only packets received from the active ATM line (port number of ATM-1) to the packet-switched network among packets received from the active ATM line (port number of ATM-1) and the standby ATM line (port number of ATM-0) for upstream direction. In this case, all packets received from the standby ATM line (port number of ATM-0) are discarded.

Then, for downstream direction, the packet processing unit 101 refers to the APS control table 1013 and transmits packets received from the packet-switched network to both of the active ATM line (port number of ATM-1) and the standby ATM line (port number of ATM-0). In this case, the destination MAC address given to the received packet is "MAC-1" which is the MAC address given to the ATM interface circuit 104 (port number of ATM-1) corresponding to the active ATM line. However, the ATM interface circuit 103 (port number of ATM-0) corresponding to the standby ATM line can acquires this packet by comparing the destination MAC address with the APS matching MAC address of MAC-1 registered in the MAC address table 1031. The respective ATM interface circuits 103, 104 extracts an ATM cell from the acquired packet and transmit the extracted ATM cell to CE 110.

Because the contents of the APS control table in CE 110 have also been rewritten similarly, CE 110 transmits only the received ATM cell from the ATM interface circuit 113 which corresponds to the active line in CE 110 to an apparatus located in the lower hierarchy (not shown). And, CE 110 discards the ATM cell received from the ATM interface circuit 112 which corresponds to the standby line in CE 110.

(Operation in Case of "Circuit Failure Change-Over)

FIG. 13 is a block diagram for explaining an operation of the APS function relating to data stream of upstream direction in case of "Circuit Failure Change-over" according to the first exemplary embodiment. FIG. 14 is a block diagram for explaining an operation of the APS function relating to data stream of downstream direction in case of "Circuit Failure Change-over" according to the first exemplary embodiment.

When a failure has occurred in an active transmission line (ATM-0) between PE 100 and CE 110, the ATM interface circuit 103 of PE 100 and the ATM interface circuit 112 of CE 110 detect the failure and transmit an event for informing the failure has occurred to the respective control apparatus (not shown) such as the CPU.

The control apparatus of PE 100 rewrites contents of the APS control table 1013 provided in the packet processing unit 101 in order to operate the APS function of this case. The contents of the APS control table 1013 corresponding to the port which accommodates the failure transmission line are rewritten, and also the contents of the APS control table 1013 corresponding to the other port of pair for the APS function are rewritten as described in FIG. 7. In this case, packets transmitted from the active ATM line in which the failure has occurred cannot be used any longer, and packets transmitted from the standby ATM line should be used. Therefore, the active ATM line is put in a failure (or blocked) state and the standby ATM line is put in an active state.

In other words, the control apparatus of PE 100 identifies a pair of ATM lines for the APS function and sets the respective "effective/invalid" flags corresponding to port number of ATM-0 and port number of ATM-1 to "invalid". At that time, the control apparatus of PE 100 may rewrite the content of the "state" field corresponding to port number of ATM-0 to "failure (or blocked)" and the "state" field corresponding to port number of ATM-1 to "active".

Similar control is also performed in CE 110, and the control apparatus of CE 110 identifies that the line corresponding to ATM-0 is failure (or blocked). And, the control apparatus of CE 110 rewrites information of the APS control table provided in CE 110 corresponding to the relevant lines.

The operation of the APS function in such state for upstream direction will be described with reference to FIG. 13.

As mentioned above, when a failure has occurred, the contents of the APS control table 1013 provided in the packet processing unit 101 of PE 100 are rewritten. Also, ATM cells do not flow to the active ATM line ATM-0 due to the failure, and output of data from the ATM interface circuit 103 stops.

On the other hand, transmission packets keep being transmitted from the ATM interface circuit 104 corresponding to port number ATM-1 to the packet processing unit 101.

When the failure has occurred, the contents of the APS control table 1013 provided in the packet processing unit 101 are rewritten as mentioned above.

In the operation of the packet processing unit 101 described with reference to FIG. 15, when the APS control table 1013 is referred to in S1504 for transmitting a packet from the ATM interface circuit 104, the contents have been rewritten, and the "effective/invalid" flag is now being set to "invalid". Therefore, the packet including the source MAC address of MAC-1 received from the ATM interface circuit 104 which is corresponding to port number of ATM-1 should be transmitted to the packet-switched network unconditionally. And, the source MAC address of MAC-1 is correlated with port number of ATM-1, and the source MAC address of MAC-1 and port number of ATM-1 are stored in the MAC table 1014.

The packet processing unit 101 transmits the packet received from this ATM interface circuit 104 corresponding to port number of ATM-1 to a destination party (not shown) of this communication via the packet-switched network. At that time, the source MAC address included in the transmission packet is the MAC address of MAC-1 given to the ATM interface circuit 104.

The APS function for upstream direction works in this way, and only the packet outputted from the ATM interface circuit 104 which used to be corresponding to the standby ATM line is transmitted to the destination party of the communication.

Next, an operation of the APS function for downstream direction will be described with reference to FIG. 14.

The active ATM line and the standby ATM line have been changed over each other, and as the result, the packet outputted from the ATM interface circuit 104, which is now corresponding to the active ATM line, is transmitted for upstream direction. Therefore, the destination party of the communication transmits a responding packet in which the source MAC address of MAC-1 included in the received packet at the destination party is attached as the destination MAC address. This packet having the destination MAC address of MAC-1 is received by PE 100 via the packet-switched network. The packet processing unit 101 of PE100 performs switching and routing operation of the received packet in which the received packet is transmitted to desired ATM interface circuit according to the destination MAC address included in the received packet.

As it has been described with reference to FIG. 16, the packet processing unit 101 compares the destination MAC address of MAC-1 included in the received packet with the source MAC address stored in the MAC table 1014, and identifies port number of ATM-1 corresponding to the source MAC address of MAC-1 which coincides with the compared destination MAC address of MAC-1. And, the packet processing unit 101 transmits the received packet to a port corresponding to the identified port number of ATM-1.

The packet processing unit 101 also refers to the APS control table 1013. At this time, if "effective" is set to the "effective/invalid" flag corresponding to the identified port number, the packet processing unit 101 obtains the port number registered as the APS matching port number in the APS control table 1013. And, the packet processing unit 101 transmits the received packet to both of the ATM interface circuits corresponding to the identified port number and the APS matching port number.

However, as "invalid" is now set to the "effective/invalid" flag corresponding to the identified port number of ATM-1, the packet processing unit 101 transmits the received packet only to the ATM interface circuit 104 corresponding to the port number of ATM-1 identified from the MAC table 1014 as shown in S1007.

At this time, the packet is not transmitted to the ATM interface circuit 103 because any information relating to the other ATM interface circuit 103 of pair for the APS function is not referred as long as the "effective/invalid" flag is set to "invalid". In this way, for downstream direction, transmission of packets to the ATM interface circuit 103 having a failure is suspended.

In the ATM interface circuit 104, because the destination MAC address of MAC-1 is included in the received packet, and this MAC address coincides with own MAC address of MAC-1 given to the ATM interface circuit 104, the ATM interface circuit 104 acquires this packet and extracts an ATM cell from this packet. Then, the ATM interface circuit 104 transmits the extracted ATM cell to the ATM interface circuit 113 of CE 110.

In addition, although not being illustrated, when the failure of ATM line corresponding to the ATM interface circuit 103 is restored, the ATM interface circuit 103 is incorporated into a pair of ATM lines for the APS function as a standby.

When the failure corresponding to the ATM interface circuit 103 has restored and the ATM interface circuit 103 has been again incorporated into a pair of ATM lines of the APS function, the APS control table 1013 may be rewritten by the built-in command. In this case, "effective" is set to the respective "effective/invalid" flags corresponding to each port number of the ATM interface circuit, "standby" is set to the "state" field corresponding to port number of ATM-0 and "active" is set to the "state" field corresponding to port number of ATM-1. If "active" has already been set to the "state" field corresponding to port number of ATM-1, it is enough to set the respective "effective/invalid" flags to "effective" and to set the "state" field corresponding to port number of ATM-0 to "standby".

This built-in control may be performed automatically. In other words, when a failure monitoring apparatus (not shown) detects failure recovery of the ATM interface circuit 103, the failure monitoring apparatus may perform the control operation in which the APS control table 1013 is rewritten as mentioned above.

The operation after incorporation of the restored ATM line has been completed is the same operation as it described with reference to FIG. 9 and FIG. 10 in which the ATM interface circuit 104 is read as the active ATM line and the ATM interface circuit 103 is read as the standby ATM line.

In other words, although packets have come to be transmitted to the packet processing unit 101 from the ATM interface circuit 103, because the "state" field corresponding to port number of ATM-0 accommodating the ATM interface circuit 103 is set "standby" in the APS control table 1013, those packets transmitted from the ATM interface circuit 103 are discarded in the packet processing unit 101 for upstream direction. Then, the MAC address of MAC-1 given to the ATM interface circuit 104 is registered in the MAC address table 1031 provided in the ATM interface circuit 103 as the APS matching MAC address. Therefore, although the destination MAC address of MAC-1 is included in a received packet, the ATM interface circuit 103 can acquire this received packet for downstream direction. And, the ATM interface circuit 103 extracts an ATM cell from this received packet and transmits the extracted ATM cell to the ATM interface circuit 112 of CE 110.

Further, the above-mentioned description is also applied to a case when the active ATM line and the standby ATM line have been changed over and then, the standby ATM line has been made to a blocked condition.

As it has been described above, the network connection apparatus according to the first exemplary embodiment can realize the APS function by the redundant composition of "1+1" basis. The network connection apparatus can transmit only packets received from the active ATM line to the packet-switched network with referring to the APS control table 1013 provided in the packet processing unit 101 for upstream direction. The network connection apparatus refers to the APS control table 1013 provided in the packet processing unit 101 and the MAC address table provided in each ATM interface circuit for downstream direction. Because the MAC address table includes the APS matching MAC address which is the MAC address of the other ATM interface circuit of pair for the APS function, the network connection apparatus can transmit received packets from the packet-switched network to both of the active ATM line and the standby ATM line for downstream direction.

(Second Exemplary Embodiment)

Next, a network connection apparatus according to a second exemplary embodiment of the present invention will be described with reference to FIG. 18.

Figure 18:
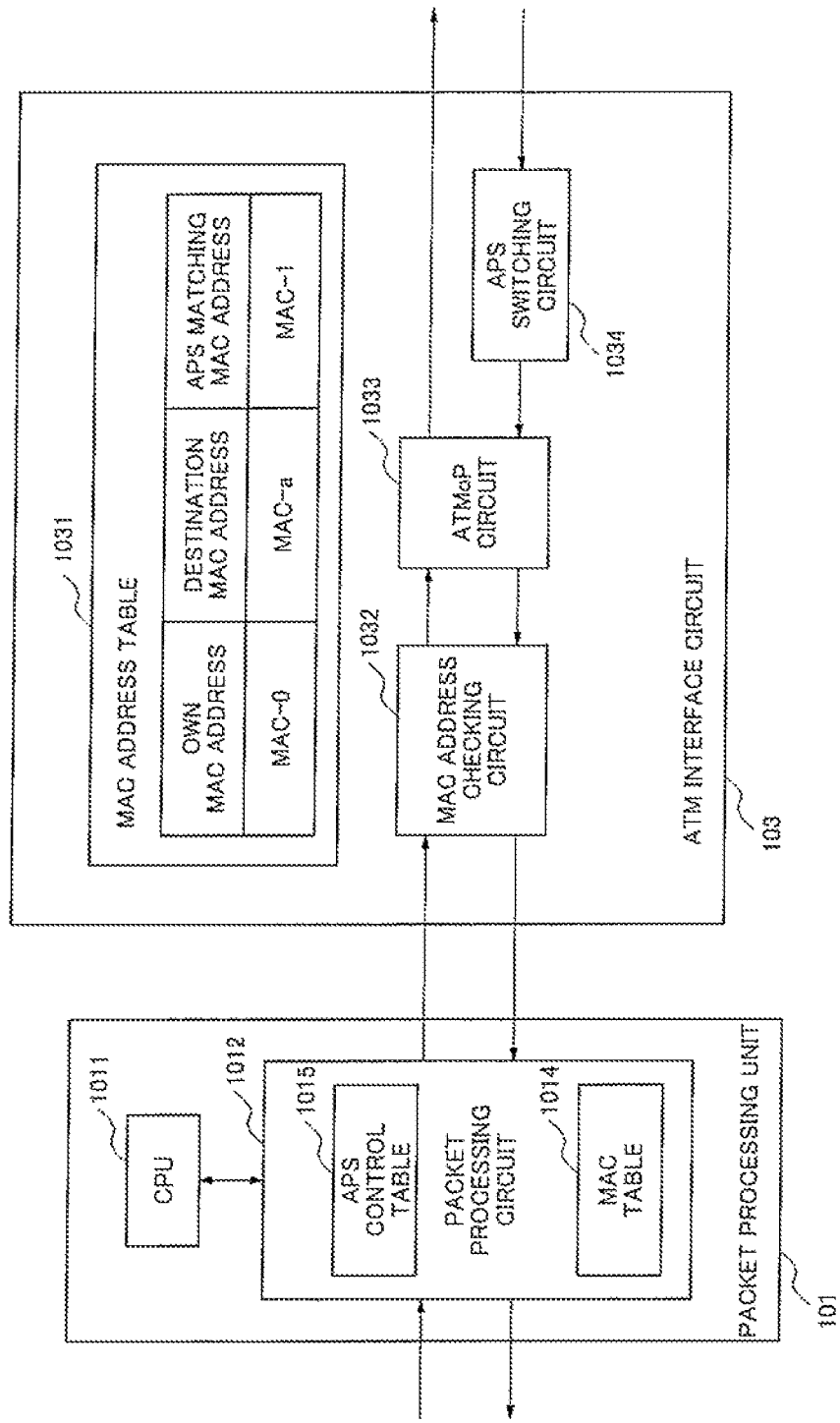
FIG. 18 is a block diagram showing a configuration of an ATM interface circuit of a network connection apparatus according to a second exemplary embodiment.

FIG. 18 is a block diagram showing a configuration of an ATM (Asynchronous Transfer Mode) interface circuit of the network connection apparatus according to the second exemplary embodiment.

In the second exemplary embodiment, only an operation of the APS function for upstream direction is different from it of the first exemplary embodiment, and an operation for downstream direction is the same as the operation of the first exemplary embodiment.

In the first exemplary embodiment, it has been configured for the APS function of upstream direction that the APS control table 1013 provided in the packet processing unit 101 was referred and only packets received from the active ATM line were handled to be transmitted to the packet-switched network.

On the other hand, the APS control table 1015 provided in the packet processing unit 101 in the second exemplary embodiment has a configuration simpler than the APS control table 1013 in the first exemplary embodiment. The APS control table 1015 of the second exemplary embodiment is configured so as to handle all packets transmitted to upstream direction. Accordingly, a processing operation such as table reference becomes simple, and as the result, the processing load of the packet processing unit 101 is reduced in the second exemplary embodiment.

In the second exemplary embodiment, it needs to be configured so as not to transmit packets from the standby ATM line to the packet processing unit 101. Therefore, each ATM interface circuit is equipped with an APS switching circuit 1034 on the side of upstream direction as shown in FIG. 18. Other constitution elements of the ATM interface circuit 103 of the second exemplary embodiment, such as the MAC address table 1031, the MAC address checking circuit 1032 and the ATMoP circuit 1033 are the same configuration as the first exemplary embodiment.

Under control of CPU 1011, the APS switching circuit 1034 performs one of control operations of transmitting ATM cells received from CE to the ATMoP circuit 1033 and discarding ATM cells received from CE. In other words, the APS switching circuit 1034 of the ATM interface circuit corresponding to the active ATM line is set to perform a control operation in which ATM cells received from CE should be transmitted to the ATMoP circuit 1033. And, the APS switching circuit 1034 of the ATM interface circuit corresponding to the standby ATM line is set to perform a control operation in which ATM cells received from CE should be discarded. Then, on the occasion of failure change over and maintenance change over, the respective control operation is set reversely.

FIG. 19 is a flowchart illustrating a setting operation of the APS function of the network connection apparatus according to the second exemplary embodiment. FIG. 20 is a figure showing an example of contents of the APS control table 1015 provided in the packet processing unit 101 in the second exemplary embodiment.

An APS setting command with relating parameters is inputted by maintenance personnel (S1901). The parameters include port number information, MAC address information and active/standby information corresponding to an active ATM line and a standby ATM line respectively.

CPU 1011 performs a data setting operation in the APS control table 1015 based on the parameter information inputted by the APS setting command (S1902), as it has been described with reference to FIG. 5 in the first exemplary embodiment.

As shown in FIG. 20, the APS control table 1015 provided in the packet processing unit 101 in the second exemplary embodiment stores only the "effective/invalid" flag and the matching port number of the other ATM line of pair for the APS function corresponding to each port number. And, this APS control table 1015 is only used when distributing received packets of downstream direction to desired port, and this APS control table 1015 is not used for a packet transmission operation of upstream direction.

Next, CPU 1011 sets data in the MAC address table 1031 (S1403). CPU 1011 also performs an operation for setting of the APS switching circuit 1034 in each ATM interface circuit (S1404) In other words, CPU 1011 instructs the APS switching circuit 1034 in the ATM interface circuit corresponding to the active ATM line to set so that ATM cells received from CE are transferred to the ATMoP circuit 1033. On the other hand, CPU 1011 instructs the APS switching circuit 1034 in the ATM interface circuit corresponding to the standby ATM line to set so that ATM cells received from CE should be discarded.

Thus, the network connection apparatus of the second exemplary embodiment configured as above encapsulates an ATM cell only received from the active ATM line in a packet. Any special processing is unnecessary for the packet processing unit 101 of the second exemplary embodiment because the packet processing unit 101 receives packets to be transmitted only from a port corresponding to the active ATM line. The packet processing unit 101 may only perform the MAC address learning which stores the port number and its corresponding source MAC address included in the packet in the MAC table 1014 when transmitting a packet from each port to the packet-switched network.

As it has been described in the first exemplary embodiment, the packet processing unit 101 identifies the desired port number for distributing a received packet by using a destination MAC address included in the received packet for downstream direction with reference to the MAC table 1014, and then, the packet processing unit 101 identifies whether the APS function is needed or not for the identified port number with reference to the APS control table 1015.

When the APS function is needed which is discriminated by the "effective/invalid" flag being set to "effective", the packet processing unit 101 obtains the matching port number. Then, the packet processing unit 101 transmits the received packet to both of ports corresponding to the identified port number and the matching port number.

When the APS function is not needed which is discriminated by the "effective/invalid" flag being set to "invalid", the packet processing unit 101 transmits the received packet only to the port which has been identified by the destination MAC address in the MAC table 1014.

The packet received by each ATM interface circuit is processed by the same manner like the first exemplary embodiment.

In this way, the network connection apparatus of the second exemplary embodiment can realize the APS function in the redundant configuration of "1+1" basis.

Further, although the APS switching circuit 1034 is provided in the input side of the ATMoP circuit 1033 in FIG. 18, the APS switching circuit 1034 may be provided in the output side of the ATMoP circuit 1033.

When the APS switching circuit 1034 is provided in the input side of the ATMoP circuit 1033, it will effect to reduce in processing load of the ATMoP circuit 1033 because it is not necessary to input wasteful ATM cells to the ATMoP circuit 1033. On the other hand, when the APS switching circuit 1034 is provided in the output side of the ATMoP circuit 1033, it will effect to absorb disconnection time during the change over lines because the packet has already been generated and available at the standby line side.

(Third Exemplary Embodiment)

Figure 21:
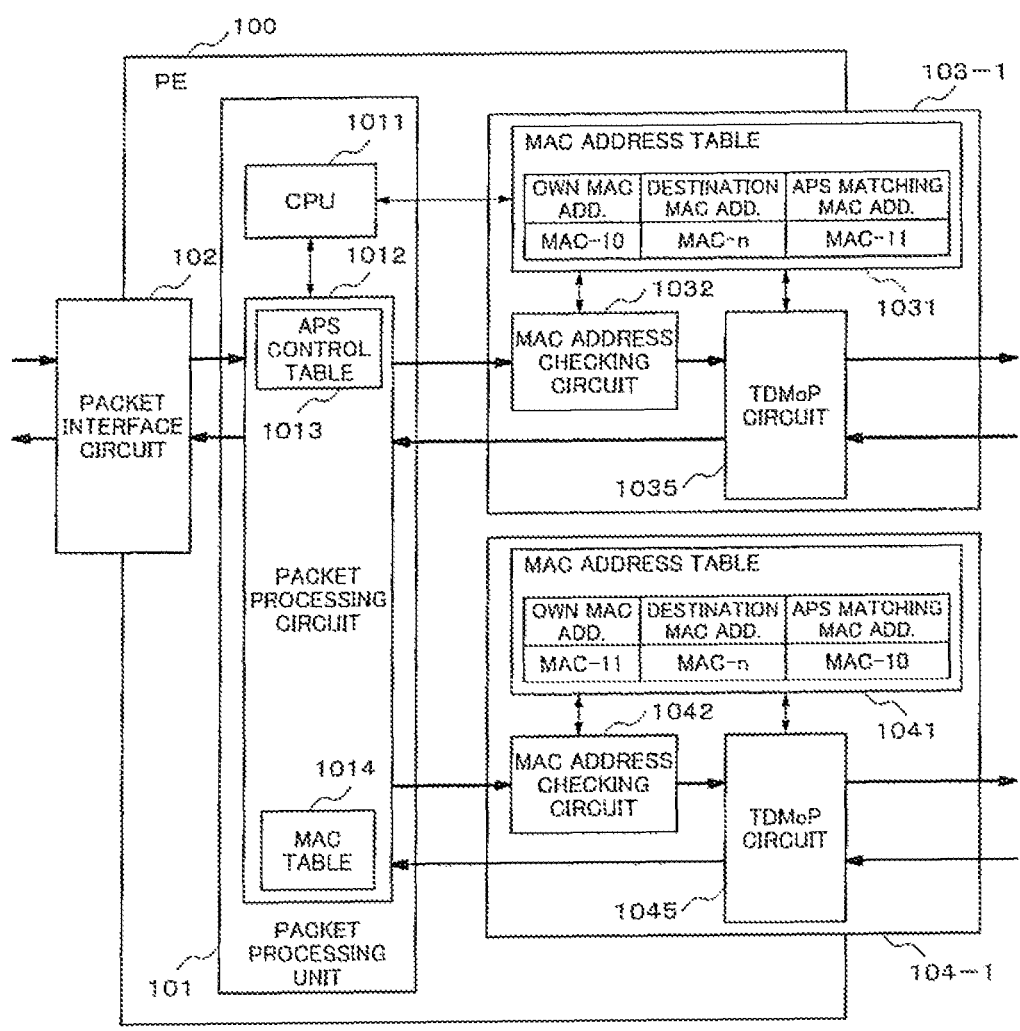
FIG. 21 is a block diagram showing a configuration of a network connection apparatus according to a third exemplary embodiment.

FIG. 21 is a block diagram showing a configuration of a network connection apparatus according to a third exemplary embodiment.

The third exemplary embodiment has a configuration equipped with TDM (Time Division Multiplex) interface circuits 103-1 and 104-1 corresponding to an active TDM line and a standby TDM line respectively. The TDM interface circuit is used when the network between the network connection apparatus and the apparatus located in the lower hierarchy is a TDM (Time Division Multiplex) network.

The TDM interface circuit includes a TDMoP (TDM over packet) circuit which generates a packet based on TDM data transmitted from the TDM network, and the network connection apparatus transmits the generated packet to the packet-switched network. On the other hand, the TDMoP circuit disassembles a packet received from the packet-switched network, extracts TDM data included in the received packet, and transmits the extracted TDM data to the TDM network.

Other configurations are same as those of the first exemplary embodiment. Also, operations as the APS function are same as those described in the first exemplary embodiment.

(Fourth Exemplary Embodiment)

Figure 22:
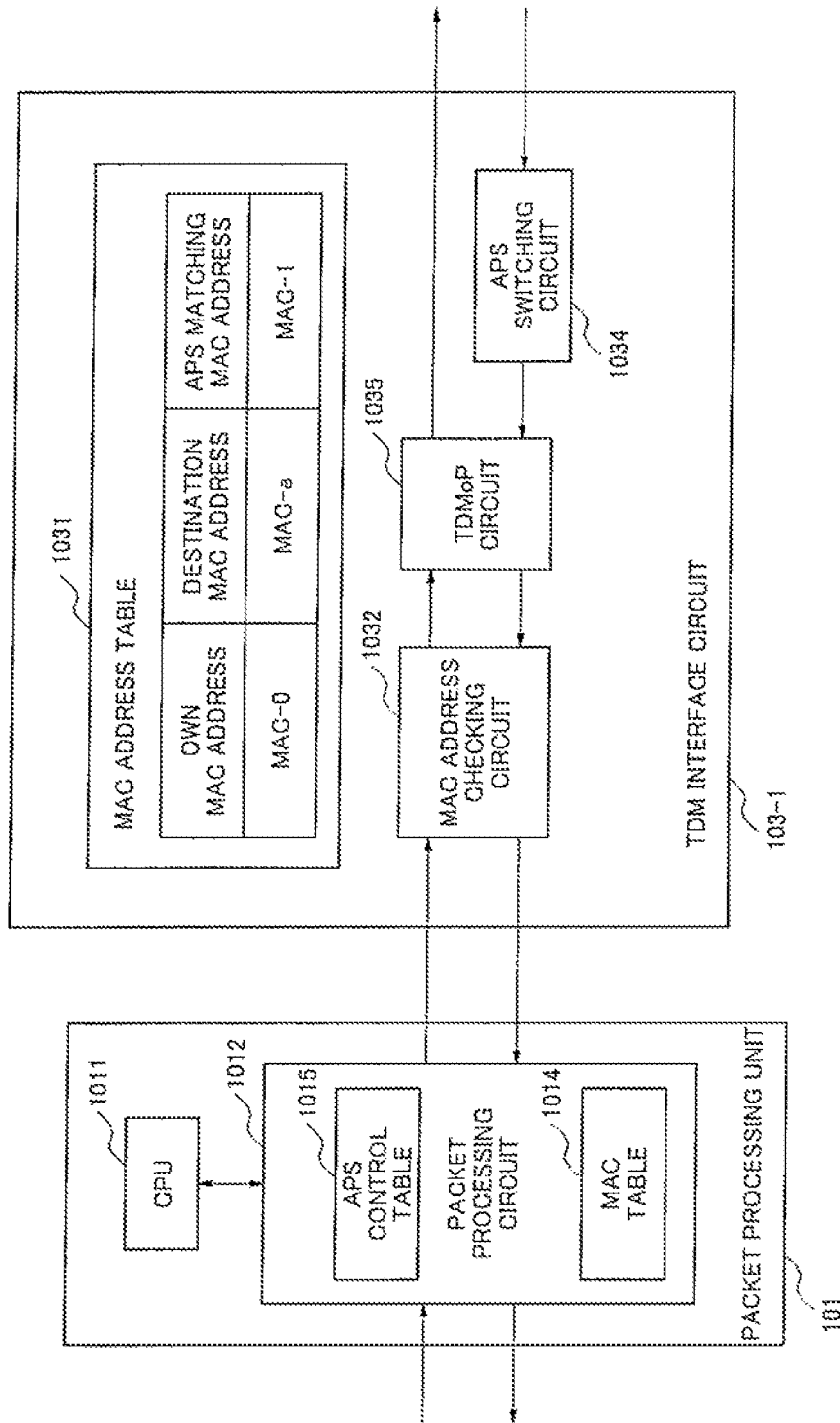
FIG. 22 is a block diagram showing a configuration of an ATM interface circuit of a network connection apparatus according to a fourth exemplary embodiment.

FIG. 22 is a block diagram showing a configuration of a TDM (Time Division Multiplex) interface circuit of a network connection apparatus according to a fourth exemplary embodiment.

The fourth exemplary embodiment has a configuration of combining the second exemplary embodiment and the third exemplary embodiment, and the APS switching circuit 1034 on the side of upstream direction is provided in the TDM (Time Division Multiplex) interface circuit 103-1 as shown in FIG. 22. Also, the APS control table 1015 as shown in FIG. 20 is provided in the packet processing unit 101.

In the fourth exemplary embodiment, only an operation of the APS function for upstream direction is different from it of the third exemplary embodiment, and an operation for downstream direction is the same as the operation of the third exemplary embodiment which is the same as the operation of the first exemplary embodiment.

With respect to the operation of the APS function for upstream direction, it is the same as the operation of the second exemplary embodiment except for that data to be handled in the fourth exemplary embodiment is TDM data while ATM cells are handled in the second exemplary embodiment.

Although not being illustrated, a pair of ATM lines of the first exemplary embodiment and a pair of TDM lines of the third exemplary embodiment may be provided in the same network connection apparatus according to the other exemplary embodiment of the present invention. Also, a pair of ATM lines of the second exemplary embodiment and a pair of TDM lines of the fourth exemplary embodiment may be provided in the same network connection apparatus according to further the other exemplary embodiment of the present invention. The type of the circuit-switched network lines accommodated in the network connection apparatus according to the present invention is not limited to the ATM lines and the TDM lines, other circuit-switched network lines may also be accommodated in the same network connection apparatus by any combination, and number of pairs is also not limited.

As it has been described above, the network connection apparatus according to the present invention accommodates the circuit-switched network lines including the ATM lines and the TDM lines and interconnects those circuit-switched network lines and packet-switched network, and can realize the APS function by the redundant configuration of "1+1" basis even if the concept of MAC address which does not exist in the circuit-switched network is used for a routing operation of the network connection apparatus.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A network connection apparatus which is provided with a pair of transmission lines to interface with a circuit-switched network by a redundant configuration of 1+1 basis and interconnects between the circuit-switched network and a packet switched network comprising:

a pair of line interface circuits which accommodates each transmission line provided to interface with the circuit-switched network, composes an active line and a standby line of the redundant configuration, and mutually converts data used in the circuit-switched network and a packet used in the packet-switched network; and a packet processing unit which interfaces with the packet-switched network and performs a sending and receiving process of the packet between the line interface circuit and the packet-switched network, wherein the packet processing unit transmits the packet received only from the line interface circuit of the active line to the packet-switched network, and transmits the packet received from the packet-switched network to both of the line interface circuits of the active line and the standby line, and wherein the line interface circuit acquires the packet transmitted from the packet processing unit when a destination MAC (Media Access Control) address included in the packet coincides with a first MAC address which is given to own line interface circuit or a second MAC address which is given to the other line interface circuit of pair for the redundant configuration,
wherein the line interface circuit comprises:
packet converting circuit which mutually converts the data used in the circuit-switched network and the packet used in the packet-switched network, generates the packet from the data used in the circuit-switched network and attaches the first MAC address as a source MAC address to the packet;
a MAC address table which stores the first MAC address and the second MAC address; and
a MAC address checking circuit which compares the destination MAC address included in the packet transmitted from the packet processing unit with each MAC address stored in the MAC address table, and acquires the packet when the destination MAC address coincides with one of the first MAC address and the second MAC address,
wherein, the packet converting circuit disassembles the packet acquired by the MAC address checking circuit and extracts the data used in the circuit-switched network,
wherein the packet processing unit comprising:
a control table which stores discrimination information of the active line or the standby line for each line interface circuit corresponding to a port number given to the line interface circuit;
a packet processing circuit which identifies the port number of the line interface circuit from which the packet having been outputted for transmission, discriminates whether the line interface circuit is the active line or the standby line with reference to the control table by using the identified port number as a key, transmits the packet to the packet-switched network when the line interface circuit is discriminated as the active line and discards the packet when the line interface circuit is discriminated as the standby line;
a MAC table which memorizes the source MAC address included in the packet transmitted to the packet-switched network and the port number of the line interface circuit from which the packet transmitted to the packet-switched network having been outputted,
wherein the control table further stores an indication flag which shows whether the redundant configuration of an active and a standby for the line interface circuit is effective or invalid corresponding to each port number of the line interface circuit, and
wherein the packet processing circuit includes
an upstream direction transfer means which refers to the control table by using the identified port number as a key, identifies the indication flag whether the redundant configuration is effective or invalid, discriminates whether the line interface circuit is the active line or the standby line when the indication flag shows being effective, transmits the packet to the packet-switched network when the line interface circuit is discriminated as the active line and discards the packet when the line interface circuit is discriminated as the standby line.

2. The network connection apparatus according to claim 1, wherein the upstream direction transfer means transmits the packet outputted from the line interface circuit to the packet-switched network when the indication flag corresponding to the port number of the line interface circuit shows being invalid.

3. The network connection apparatus according to claim 2, further comprising
a table setting change means which rewrites contents of the indication flag to be invalid corresponding to both of the port numbers of the pair of line interface circuits when the line interface circuit of the active line has become a failure condition.

4. The network connection apparatus according to claim 1, wherein the control table further includes matching port number information which shows the port number of the other line interface circuit of pair corresponding to each port number of the line interface circuit, and
wherein the packet processing circuit includes
a downstream direction transfer means which refers to the MAC table by using the destination MAC address included in the packet received from the packet-switched network as a key, identifies a first port number corresponding to the source MAC address which coincides with the destination MAC address of the packet, refers to the control table by using the identified first port number as a key, identifies a second port number of the corresponding matching port number information, and transmits the packet received from the packet-switched network to both of ports corresponding to the first port number and the second port number.

5. The network connection apparatus according to claim 4, wherein the control table further stores an indication flag which shows whether the redundant configuration of an active and a standby for the line interface circuit is effective or invalid corresponding to each port number of the line interface circuit, and
wherein the downstream direction transfer means transmits the packet received from the packet-switched network to both of ports corresponding to the first port number and the second port number when the indication flag corresponding to the first port number shows being effective, and transmits the packet received from the packet-switched network to only the port corresponding to the first port number when the indication flag corresponding to the first port number shows being invalid.

6. The network connection apparatus according to claim 5, further comprising
a table setting change means which rewrites contents of the indication flag to be invalid corresponding to both of the port numbers of the pair of line interface circuits when the line interface circuit of the active line has become a failure condition.

7. The network connection apparatus according to claim 2, wherein the control table further includes matching port number information which shows the port number of the other line interface circuit of pair corresponding to each port number of the line interface circuit, and
wherein the packet processing circuit includes
a downstream direction transfer means which refers to the MAC table by using the destination MAC address included in the packet received from the packet-switched network as a key, identifies a first port number corresponding to the source MAC address which coincides with the destination MAC address of the packet, refers to the control table by using the identified first port number as a key, identifies a second port number of the corresponding matching port number information, and transmits the packet received from the packet-switched network to both of ports corresponding to the first port number and the second port number.

8. The network connection apparatus according to claim 7, wherein the downstream direction transfer means transmits the packet received from the packet-switched network to both of ports corresponding to the first port number and the second port number when the indication flag corresponding to the first port number shows being effective, and transmits the packet received from the packet-switched network to only the port corresponding to the first port number when the indication flag corresponding to the first port number shows being invalid.

9. The network connection apparatus according to claim 8, further comprising
a table setting change means which rewrites contents of the indication flag to be invalid corresponding to both of the port numbers of the pair of line interface circuits when the line interface circuit of the active line has become a failure condition.

10. The network connection apparatus according to claim 1, the line interface circuit further comprising
a switching circuit which allows to input the data used in the circuit-switched network to the packet converting circuit when the line interface circuit is the active line, and not to allows to input the data used in the circuit-switched network to the packet converting circuit when the line interface circuit is the standby line.

11. The network connection apparatus according to claim 1, the line interface circuit further comprising
a switching circuit which allows to output the packet generated in the packet converting circuit to the packet processing unit when the line interface circuit is the active line, and not to allows to output the packet generated in the packet converting circuit to the packet processing unit when the line interface circuit is the standby line.

12. The network connection apparatus according to claim 10, wherein the packet processing unit comprising:
a control table which stores matching port number information, which shows a port number of the other line interface circuit of pair, corresponding to each port number of the line interface circuit;
a MAC table which memorizes the source MAC address included in the packet transmitted to the packet-switched network and the port number of the line interface circuit from which the packet transmitted to the packet-switched network having been outputted; and
a downstream direction transfer means which refers to the MAC table by using the destination MAC address included in the packet received from the packet-switched network as a key, identifies a first port number corresponding to the source MAC address which coincides with the destination MAC address of the packet, refers to the control table by using the identified first port number as a key, identifies a second port number of the corresponding matching port number information, and transmits the packet received from the packet-switched network to both of ports corresponding to the first port number and the second port number.

13. The network connection apparatus according to claim 12, wherein the control table further stores an indication flag which shows whether the redundant configuration of an active and a standby for the line interface circuit is effective or invalid corresponding to each port number of the line interface circuit, and
wherein the downstream direction transfer means transmits the packet received from the packet-switched network to both of ports corresponding to the first port number and the second port number when the indication flag corresponding to the first port number shows being effective, and transmits the packet received from the packet-switched network to only the port corresponding to the first port number when the indication flag corresponding to the first port number shows being invalid.

14. The network connection apparatus according to claim 13, further comprising
a table setting change means which rewrites contents of the indication flag to be invalid corresponding to both of the port numbers of the pair of line interface circuits when the line interface circuit of the active line has become a failure condition.

15. The network connection apparatus according to claim 11, wherein the packet processing unit comprising:
a control table which stores matching port number information, which shows a port number of the other line interface circuit of pair, corresponding to each port number of the line interface circuit;
a MAC table which memorizes the source MAC address included in the packet transmitted to the packet-switched network and the port number of the line interface circuit from which the packet transmitted to the packet-switched network having been outputted; and
a downstream direction transfer means which refers to the MAC table by using the destination MAC address included in the packet received from the packet-switched network as a key, identifies a first port number corresponding to the source MAC address which coincides with the destination MAC address of the packet, refers to the control table by using the identified first port number as a key, identifies a second port number of the corresponding matching port number information, and transmits the packet received from the packet-switched network to both of ports corresponding to the first port number and the second port number.

16. The network connection apparatus according to claim 15, wherein the control table further stores an indication flag which shows whether the redundant configuration of an active and a standby for the line interface circuit is effective or invalid corresponding to each port number of the line interface circuit, and
wherein the downstream direction transfer means transmits the packet received from the packet-switched network to both of ports corresponding to the first port number and the second port number when the indication flag corresponding to the first port number shows being effective, and transmits the packet received from the packet-switched network to only the port corresponding to the first port number when the indication flag corresponding to the first port number shows being invalid.

17. The network connection apparatus according to claim 16, further comprising
a table setting change means which rewrites contents of the indication flag to be invalid corresponding to both of the port numbers of the pair of line interface circuits when the line interface circuit of the active line has become a failure condition.

18. A method of a network connection apparatus which is provided with a pair of line interface circuits, which interfaces with the circuit-switched network and composes an active line and a standby line of a redundant configuration of 1+1 basis, and interconnects between a circuit-switched network and a packet switched network, the method comprising:

generating a packet used in the packet-switched network
  by converting data used in the circuit-switched network
  in the line interface circuit, and outputting the packet to
  a packet processing unit, which interfaces with the
  packet-switched network and performs a sending and
  receiving process of the packet between the line interface circuit and the packet-switched network;
transmitting the packet inputted to the packet processing
  unit from the line interface circuit of the active line to the
  packet-switched network;
transmitting the packet received at the packet processing
  unit from the packet-switched network to both of the line
  interface circuits of the active line and the standby line;
acquiring the packet transmitted from the packet processing unit at the line interface circuit when a destination
  MAC (Media Access Control) address included in the
  packet coincides with a first MAC address which is
  given to own line interface circuit or a second MAC
  address which is given to the other line interface circuit
  of pair for the redundant configuration;
disassembling the packet acquired in the line interface
  circuit to the data used in the circuit-switched network;
attaching the first MAC address as a source MAC address
  to the packet generated in the line interface circuit;
identifying a port number given to the line interface circuit
  corresponding to the line interface circuit from which
  the packet is inputted to the packet processing unit for
  transmission;
discriminating whether the line interface circuit is the
  active line or the standby line with reference to a control
  table, which stores discrimination information of the
  active line or the standby line for each line interface
  circuit corresponding to the port number, by using the
  identified port number as a key;
transmitting the packet to the packet-switched network
  when the line interface circuit is discriminated as the
  active line and discarding the packet when the line interface circuit is discriminated as the standby line; and
memorizing, in a MAC table, the source MAC address
  included in the transmitted packet and the port number
  of the line interface circuit from which the transmitted
  packet having been inputted to the packet processing
  unit,
wherein the control table further stores an indication flag
  which shows whether the redundant configuration of an
  active and a standby for the line interface circuit is effective or invalid corresponding to each port number of the
  line interface circuit, the method further comprising:
  identifying the indication flag whether the redundant
    configuration is effective or invalid with reference to
    the control table by using the identified port number
    as a key; and
  discriminating whether the line interface circuit is the
    active line or the standby line when the indication flag
    shows being effective, and
  transmitting the packet to the packet-switched network
    when the line interface circuit is discriminated as the
    active line and discarding the packet when the line
    interface circuit is discriminated as the standby line.

19. The method according to claim 18, further comprising:
transmitting the packet outputted from the line interface
  circuit to the packet-switched network when the indication flag corresponding to the port number of the line
  interface circuit shows being invalid.

20. The method according to claim 19, further comprising:
rewriting contents of the indication flag to be invalid corresponding to both of the port numbers of the pair of line
  interface circuits when the line interface circuit of the
  active line has become a failure condition.

21. The method according to claim 18, wherein the control
table further stores matching port number information, which
shows the port number of the other line interface circuit of
pair, corresponding to each port number of the line interface
circuit, the method further comprising:
  receiving the packet from the packet-switched network;
  identifying a first port number memorized in the MAC
    table in association with the source MAC address which
    coincides with the destination MAC address included in
    the packet;
  identifying a second port number shown by the matching
    port number information corresponding to the first port
    number; and
  transmitting the packet received from the packet-switched
    network to both of ports corresponding to the first port
    number and the second port number.

22. The method according to claim 21, wherein the control
table further stores an indication flag which shows whether
the redundant configuration of an active and a standby for the
line interface circuit is effective or invalid corresponding to
each port number of the line interface circuit, the method
further comprising:
  transmitting the packet received from the packet-switched
    network to both of ports corresponding to the first port
    number and the second port number when the indication
    flag corresponding to the first port number shows being
    effective; and
  transmitting the packet received from the packet-switched
    network to only the port corresponding to the first port
    number when the indication flag corresponding to the
    first port number shows being invalid.

23. The method according to claim 22, further comprising:
rewriting contents of the indication flag to be invalid corresponding to both of the port numbers for the pair of
  line interface circuits when the line interface circuit of
  the active line has become a failure condition.

24. The method according to claim 18, wherein the control
table further stores matching port number information, which
shows the port number of the other line interface circuit of
pair, corresponding to each port number of the line interface
circuit, the method further comprising:
  receiving the packet from the packet-switched network;
  identifying a first port number memorized in the MAC
    table in association with the source MAC address which
    coincides with the destination MAC address included in
    the packet;
  identifying a second port number shown by the matching
    port number information corresponding to the first port
    number; and
  transmitting the packet received from the packet-switched
    network to both of ports corresponding to the first port
    number and the second port number.

25. The method according to claim 24, further comprising:
  transmitting the packet received from the packet-switched
    network to both of ports corresponding to the first port
    number and the second port number when the indication
    flag corresponding to the first port number shows being
    effective; and
  transmitting the packet received from the packet-switched
    network to only the port corresponding to the first port
    number when the indication flag corresponding to the
    first port number shows being invalid.

26. The method according to claim 25, further comprising:
rewriting contents of the indication flag to be invalid corresponding to both of the port numbers for the pair of line interface circuits when the line interface circuit of the active line has become a failure condition.

27. The method according to claim 18, further comprising:
allowing to output the packet from the line interface circuit to the packet processing unit when the line interface circuit is the active line; and
stopping to output the packet from the line interface circuit to the packet processing unit when the line interface circuit is the standby line.

28. The method according to claim 27, further comprising:
memorizing, in a MAC table, a source MAC address attached to the packet generated in the line interface circuit and a port number given to the line interface circuit corresponding to the line interface circuit from which the packet having been inputted to the packet processing unit for transmission;
receiving the packet from the packet-switched network;
identifying a first port number memorized in the MAC table in association with the source MAC address which coincides with the destination MAC address included in the packet;
identifying a second port number shown by matching port number information corresponding to the first port number, wherein the matching port number information is stored in a control table corresponding to each port number of the line interface circuit and shows a port number of the other line interface circuit of pair; and
transmitting the packet received from the packet-switched network to both of ports corresponding to the first port number and the second port number.

29. The method according to claim 28, wherein the control table further stores an indication flag which shows whether the redundant configuration of an active and a standby for the line interface circuit is effective or invalid corresponding to each port number, further comprising:
transmitting the packet received from the packet-switched network to both of ports corresponding to the first port number and the second port number when the indication flag corresponding to the first port number shows being effective; and
transmitting the packet received from the packet-switched network to only the port corresponding to the first port number when the indication flag corresponding to the first port number shows being invalid.

30. The method according to claim 29, further comprising:
rewriting contents of the indication flag to be invalid corresponding to both of the port numbers of the pair of line interface circuits when the line interface circuit of the active line has become a failure condition.

* * * * *